(12) United States Patent
Parks et al.

(10) Patent No.: US 6,964,108 B2
(45) Date of Patent: Nov. 15, 2005

(54) VEHICLE COMPASS SYSTEM WITH CONTINUOUS AUTOMATIC CALIBRATION

(75) Inventors: Jeffrey N. Parks, Holland, MI (US); Thomas R. Olson, Holland, MI (US); David J. Slater, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 11/001,532

(22) Filed: Dec. 1, 2004

(65) Prior Publication Data

US 2005/0091861 A1 May 5, 2005

Related U.S. Application Data

(63) Continuation of application No. 10/663,954, filed on Sep. 16, 2003, now Pat. No. 6,857,194, which is a continuation of application No. 09/912,273, filed on Jul. 24, 2001, now Pat. No. 6,643,941, which is a continuation of application No. 09/320,924, filed on May 27, 1999, now Pat. No. 6,301,794.

(51) Int. Cl.$^7$ .............................................. G01C 17/38
(52) U.S. Cl. .......................................... 33/356; 702/85
(58) Field of Search ................................ 33/355 R, 356, 33/357–359, 361, 502; 702/85, 92–95

(56) References Cited

U.S. PATENT DOCUMENTS

| | | |
|---|---|---|
| 2,053,154 A | 9/1936 | Pierre |
| 2,056,715 A | 10/1936 | Dinsmore |
| 2,132,168 A | 10/1938 | Klein et al. |
| 2,155,712 A | 4/1939 | Hull |
| 2,177,218 A | 10/1939 | Klein et al. |
| 2,308,566 A | 1/1943 | Noxon |
| 2,475,593 A | 7/1949 | Craddock et al. |
| 2,852,859 A | 9/1958 | Depp |
| 2,903,798 A | 9/1959 | Taylor |
| 2,959,865 A | 11/1960 | Boose |
| 3,197,880 A | 8/1965 | Rice et al. |
| 3,253,342 A | 5/1966 | Depp |
| 3,415,980 A | 12/1968 | Maieli et al. |
| 3,541,853 A | 11/1970 | Anderson |
| 3,626,280 A | 12/1971 | Van Englehoven |

(Continued)

FOREIGN PATENT DOCUMENTS

| | | |
|---|---|---|
| DE | 2922230 | 10/1980 |
| DE | 3611147 | 10/1986 |
| DE | 3613560 | 10/1987 |

(Continued)

OTHER PUBLICATIONS

TOYOTA publication regarding CORONA, 1982, 25 pgs. (not in English).

*Primary Examiner*—G. Bradley Bennett
(74) *Attorney, Agent, or Firm*—Foley & Lardner LLP

(57) ABSTRACT

The compass system of the present invention utilizes an improved calibration routine in which a processing circuit of the compass recalibrates the compass each time three data points are obtained from a magnetic field sensor that meet predetermined criteria. One such criterion is that the three data points define corners of a triangle that is substantially non-obtuse. When three data points have been obtained that define a triangle meeting this criterion, the processing circuit calculates a center point for a circle upon which all three data points lie by solving the equation $x^2+y^2+Ax+By+C=0$ for A, B, and C, using the coordinate values (x,y) for the three data points and defining the center point as (−A/2, −B/2).

7 Claims, 21 Drawing Sheets

U.S. PATENT DOCUMENTS

| | | |
|---|---|---|
| 3,634,946 A | 1/1972 | Star |
| 3,678,593 A | 7/1972 | Baker et al. |
| 3,680,951 A | 8/1972 | Jordan et al. |
| 3,683,668 A | 8/1972 | Baker et al. |
| 3,691,643 A | 9/1972 | Baker et al. |
| 3,744,312 A | 7/1973 | Anderson |
| 3,746,842 A | 7/1973 | Fowler |
| 3,778,703 A | 12/1973 | Jackson |
| 3,807,666 A | 4/1974 | Devlin |
| 3,903,610 A | 9/1975 | Heaviside et al. |
| 3,938,257 A | 2/1976 | Erspamer |
| 3,943,763 A | 3/1976 | Garner |
| 3,971,981 A | 7/1976 | Nakagome et al. |
| 3,991,361 A | 11/1976 | Mattern et al. |
| 4,023,018 A | 5/1977 | Hall |
| 4,024,382 A | 5/1977 | Fowler |
| 4,030,204 A | 6/1977 | Edwards |
| 4,031,630 A | 6/1977 | Fowler |
| 4,091,543 A | 5/1978 | Lapeyre |
| 4,112,755 A | 9/1978 | Sullivan |
| 4,139,892 A | 2/1979 | Gudea et al. |
| 4,143,467 A | 3/1979 | Erspamer et al. |
| 4,146,970 A | 4/1979 | Edwards |
| 4,157,619 A | 6/1979 | Zuvela |
| 4,163,326 A | 8/1979 | Edwards |
| 4,179,741 A | 12/1979 | Rossani |
| 4,250,626 A | 2/1981 | Lazar |
| 4,277,751 A | 7/1981 | Lawson et al. |
| 4,293,815 A | 10/1981 | West et al. |
| 4,309,828 A | 1/1982 | Sakamoto |
| 4,323,972 A | 4/1982 | Winter |
| 4,336,596 A | 6/1982 | Martin |
| 4,341,023 A | 7/1982 | Marcus et al. |
| 4,347,730 A | 9/1982 | Fisher et al. |
| 4,373,271 A | 2/1983 | Nitz |
| 4,388,558 A | 6/1983 | Mizuno et al. |
| 4,402,142 A | 9/1983 | Dinsmore |
| 4,413,424 A | 11/1983 | Sasaki et al. |
| 4,414,753 A | 11/1983 | Moulin et al. |
| 4,416,067 A | 11/1983 | Scherer et al. |
| 4,418,480 A | 12/1983 | Garner |
| 4,424,631 A | 1/1984 | Franks |
| 4,425,717 A | 1/1984 | Marcus |
| 4,429,469 A | 2/1984 | Tsushima et al. |
| 4,445,279 A | 5/1984 | Tsushima et al. |
| 4,497,034 A | 1/1985 | Kuno et al. |
| 4,505,054 A | 3/1985 | Clark et al. |
| 4,539,760 A | 9/1985 | Marchent et al. |
| 4,546,550 A | 10/1985 | Marchent et al. |
| 4,546,551 A | 10/1985 | Franks |
| 4,555,761 A | 11/1985 | Matsumoto et al. |
| 4,593,359 A | 6/1986 | Sadeh |
| 4,611,293 A | 9/1986 | Hatch et al. |
| 4,616,424 A | 10/1986 | Arakawa et al. |
| 4,622,754 A | 11/1986 | Chujo et al. |
| 4,622,843 A | 11/1986 | Hormel |
| 4,640,016 A | 2/1987 | Tanner et al. |
| 4,642,776 A | 2/1987 | Matsumoto et al. |
| 4,646,015 A | 2/1987 | Phillips |
| 4,646,089 A | 2/1987 | Takanabe et al. |
| 4,652,860 A | 3/1987 | Weishaupt et al. |
| 4,660,161 A | 4/1987 | Okada |
| 4,672,565 A | 6/1987 | Kuno et al. |
| 4,673,878 A | 6/1987 | Tsushima et al. |
| 4,677,381 A | 6/1987 | Geerlings |
| 4,677,754 A | 7/1987 | Hormel |
| 4,680,866 A | 7/1987 | Johnson et al. |
| 4,685,053 A | 8/1987 | Hattori et al. |
| 4,686,772 A | 8/1987 | Sobel |
| 4,694,583 A | 9/1987 | Blaney |
| 4,698,912 A | 10/1987 | Fowler et al. |
| 4,720,992 A | 1/1988 | Hormel |
| 4,721,364 A | 1/1988 | Itoh et al. |
| 4,728,888 A | 3/1988 | Bauer et al. |
| 4,729,172 A | 3/1988 | Alberter et al. |
| 4,733,179 A | 3/1988 | Bauer et al. |
| 4,733,336 A | 3/1988 | Skogler et al. |
| 4,738,031 A | 4/1988 | Alberter et al. |
| 4,739,224 A | 4/1988 | Geerlings |
| 4,739,560 A | 4/1988 | Akutsu et al. |
| 4,743,913 A | 5/1988 | Takai |
| 4,750,349 A | 6/1988 | Luitje |
| 4,751,783 A | 6/1988 | Ina et al. |
| 4,757,455 A | 7/1988 | Tsunoda et al. |
| 4,763,072 A | 8/1988 | Katoh et al. |
| 4,763,268 A | 8/1988 | Itoh et al. |
| 4,763,269 A | 8/1988 | Suyama et al. |
| 4,763,270 A | 8/1988 | Itoh et al. |
| 4,771,547 A | 9/1988 | Akutsu et al. |
| 4,782,453 A | 11/1988 | Bauer et al. |
| 4,791,729 A | 12/1988 | Suda |
| 4,797,841 A | 1/1989 | Hatch |
| 4,807,462 A | 2/1989 | Al-Attar |
| 4,831,563 A | 5/1989 | Ando et al. |
| 4,841,449 A | 6/1989 | Suyama |
| 4,843,865 A | 7/1989 | Fowler |
| 4,851,775 A | 7/1989 | Kim et al. |
| 4,852,012 A | 7/1989 | Suyama |
| 4,862,398 A | 8/1989 | Shimizu et al. |
| 4,862,594 A | 9/1989 | Schierbeek et al. |
| 4,866,627 A | 9/1989 | Suyama |
| 4,882,689 A | 11/1989 | Aoki |
| 4,890,233 A | 12/1989 | Ando et al. |
| 4,924,402 A | 5/1990 | Ando et al. |
| 4,953,305 A | 9/1990 | Van Lente et al. |
| 4,989,333 A | 2/1991 | Helldorfer et al. |
| 5,023,799 A | 6/1991 | Nakayama et al. |
| 5,040,990 A | 8/1991 | Suman et al. |
| 5,046,031 A | 9/1991 | Wanous |
| 5,090,231 A | 2/1992 | Gallagher |
| 5,117,375 A | 5/1992 | Worcester et al. |
| 5,131,154 A | 7/1992 | Schierbeek et al. |
| 5,131,155 A | 7/1992 | Takano et al. |
| D328,587 S | 8/1992 | Arbisi |
| 5,151,872 A | 9/1992 | Suzuki et al. |
| 5,161,311 A | 11/1992 | Esmer et al. |
| 5,165,269 A | 11/1992 | Nguyen |
| 5,187,872 A | 2/1993 | Dufour |
| 5,223,814 A | 6/1993 | Suman |
| 5,235,514 A | 8/1993 | Matsuzaki |
| 5,239,264 A | 8/1993 | Hawks |
| 5,255,442 A | 10/1993 | Schierbeek et al. |
| 5,287,295 A | 2/1994 | Ives et al. |
| 5,287,297 A | 2/1994 | Ihara et al. |
| 5,297,063 A | 3/1994 | Cage |
| 5,297,065 A | 3/1994 | Cage et al. |
| 5,323,336 A | 6/1994 | Cage |
| 5,333,110 A | 7/1994 | Al-Attar |
| 5,339,246 A | 8/1994 | Kao |
| 5,345,382 A | 9/1994 | Kao |
| 5,349,529 A | 9/1994 | Masumoto et al. |
| 5,351,204 A | 9/1994 | Al-Attar |
| 5,353,241 A | 10/1994 | Al-Attar |
| 5,390,122 A | 2/1995 | Michaels et al. |
| 5,440,303 A | 8/1995 | Kinoshita |
| 5,511,319 A | 4/1996 | Geerlings et al. |
| 5,581,899 A | 12/1996 | Brehler et al. |
| 5,632,092 A | 5/1997 | Blank et al. |
| 5,644,851 A | 7/1997 | Blank et al. |
| 5,664,335 A | 9/1997 | Suman et al. |
| 5,699,044 A | 12/1997 | Van Lente et al. |

| | | | |
|---|---|---|---|
| 5,737,226 A | 4/1998 | Olson et al. | |
| 5,761,094 A | 6/1998 | Olson et al. | |
| 5,802,727 A | 9/1998 | Blank et al. | |
| 5,828,984 A | 10/1998 | Cage et al. | |
| 5,878,370 A | 3/1999 | Olson | |
| 5,946,813 A | 9/1999 | Nachbaur et al. | |
| 6,192,315 B1 | 2/2001 | Geschke et al. | |
| 6,301,794 B1 | 10/2001 | Parks et al. | |
| 6,427,349 B1 | 8/2002 | Blank et al. | |
| 6,643,941 B2 | 11/2003 | Parks et al. | |
| 6,857,194 B2 * | 2/2005 | Parks et al. | 33/356 |

FOREIGN PATENT DOCUMENTS

| | | |
|---|---|---|
| EP | 0321123 | 6/1989 |
| GB | 2193321 | 2/1998 |
| JP | 5516275 | 2/1980 |
| JP | 5729966 | 2/1982 |
| JP | 5763307 | 4/1982 |
| JP | 57116211 | 7/1982 |
| JP | 57122310 | 7/1982 |
| JP | 5817313 | 2/1983 |
| JP | 5860220 | 4/1983 |
| JP | 58135412 | 8/1983 |
| JP | 59100812 | 6/1984 |
| JP | 60244644 | 12/1985 |
| JP | 62008011 | 1/1987 |
| JP | 62145111 | 6/1987 |
| JP | 63187113 | 8/1988 |
| JP | 03068811 | 3/1991 |
| JP | 6010114 | 1/1994 |
| JP | 9512108 | 12/1997 |
| WO | WO 82/02448 | 7/1982 |

* cited by examiner

COMPASS STATE MACHINE
STATE OUTPUT MATRIX

| | STATE | DESCRIPTION | RCLEAR(1) | DELAY(1) | RENABLE_E(1) | CLEAR(0) | U/D(0) | ENABLE(1) | LATCH_N(0) | LATCH_E(0) | CHL_N(0) | CHL_S(0) | CHL_E(0) | CHL_W(0) |
|---|---|---|---|---|---|---|---|---|---|---|---|---|---|---|
| 0 | 0000 | INITIALIZE NORTH | 1 | 0 | 1 | 0 | 0 | 1 | 0 | 0 | 1 | 0 | 0 | 0 |
| 1 | 0001 | START NORTH | 0 | 1 | 1 | 0 | 0 | 1 | 0 | 0 | 1 | 0 | 0 | 0 |
| 2 | 0010 | START TIMING NORTH | 0 | 1 | 1 | 1 | 0 | 0 | 0 | 0 | 1 | 0 | 0 | 0 |
| 3 | 0011 | HALT TIMER | 1 | 0 | 1 | 1 | 1 | 1 | 0 | 0 | 0 | 1 | 0 | 0 |
| 4 | 0100 | INITIALIZE SOUTH | 1 | 1 | 1 | 1 | 1 | 1 | 0 | 0 | 0 | 1 | 0 | 0 |
| 5 | 0101 | START SOUTH | 0 | 1 | 1 | 1 | 1 | 1 | 1 | 0 | 0 | 1 | 0 | 0 |
| 6 | 0110 | START TIMING SOUTH | 0 | 1 | 1 | 1 | 1 | 0 | 0 | 0 | 0 | 0 | 0 | 0 |
| 7 | 0111 | HALT TIMER | 1 | 0 | 0 | 0 | 0 | 1 | 0 | 0 | 0 | 0 | 1 | 0 |
| 8 | 1000 | INITIALIZE EAST | 1 | 1 | 0 | 1 | 0 | 1 | 0 | 0 | 0 | 0 | 1 | 0 |
| 9 | 1001 | START EAST | 0 | 1 | 0 | 1 | 1 | 0 | 0 | 0 | 0 | 0 | 1 | 0 |
| 10 | 1010 | START TIMING EAST | 0 | 1 | 0 | 1 | 1 | 1 | 0 | 1 | 0 | 0 | 0 | 0 |
| 11 | 1011 | HALT TIMER | 1 | 0 | 0 | 1 | 1 | 1 | 0 | 0 | 0 | 0 | 0 | 1 |
| 12 | 1100 | INITIALIZE WEST | 1 | 1 | 0 | 1 | 1 | 1 | 0 | 0 | 0 | 0 | 0 | 1 |
| 13 | 1101 | START WEST | 0 | 1 | 0 | 1 | 1 | 1 | 0 | 0 | 0 | 0 | 0 | 1 |
| 14 | 1110 | START TIMING WEST | 0 | 1 | 0 | 1 | 1 | 0 | 0 | 0 | 0 | 0 | 0 | 1 |
| 15 | 1111 | HALT TIMER | 1 | 1 | 0 | 1 | 0 | 1 | 0 | 0 | 0 | 0 | 0 | 0 |

FIG. 12

VEHICLE COMPASS SYSTEM WITH CONTINUOUS AUTOMATIC CALIBRATION

CROSS-REFERENCE TO RELATED APPLICATIONS

This is a continuation of U.S. patent application Ser. No. 10/663,954, filed Sep. 16, 2003 now U.S. Pat. No. 6,857,194 which is a continuation of 09912,273 Jul. 24, 2001 now U.S. Pat. No. 6,643,941 filed Jul. 24, 2001 which is a continuation of 09320,924 May 27, 1999 now U.S. Pat. No. 6,301,794 filed May 27, 1999, the disclosures of which are hereby incorporated by reference.

BACKGROUND OF THE INVENTION

The present invention relates to magnetic direction sensing systems and particularly those for use in vehicles.

U.S. Pat. No. 4,953,305, assigned to the present assignee, discloses a magnetic field sensor and microprocessor-controlled compass system for a vehicle. The system utilizes flux-gate magnetic sensors to sense the magnitude of the earth's magnetic field in two channels of measurement. The sensor data, if plotted on an X-Y Cartesian coordinate plane, would be as shown in FIG. 1. For a properly calibrated compass, the plot of sensor data creates a perfect circle centered around the origin of the coordinate plane when the vehicle travels in a 360° loop, as indicated by graph A of FIG. 1. The radius of the circle represents the detected earth's magnetic field strength, and the vehicle's compass heading at a particular time during travel is represented by a point on the circle. By calculating the angle at which the point forms with the X-Y coordinate plane, the compass heading of the vehicle may be determined. As is known, depending on the location of the vehicle, the detected magnitude of the earth's magnetic field can vary significantly.

The sensed magnetic field will also be affected if there is a change in vehicular magnetism. Changes in the magnetism of a vehicle can be caused by, for example, driving the vehicle near the electrical power feeders of train or subway systems, installing a magnetic cellular antennae on the vehicle's roof, parking under an AC powerline, or even driving through a car wash, which can flex the sheet metal in the vicinity of the compass sensor and change its magnetic characteristics. Such a change in vehicular magnetism will cause the magnetic field sensed by the compass channels when the vehicle is heading in a given direction to be either greater than or less than that expected for a vehicle with no magnetic interference As a result, the plot of sensor data will be shifted away from the origin of the coordinate plane in some direction, resulting in a pattern such as the circle shown as graph B of FIG. 1 when the vehicle travels a 360° loop. The magnitude of the shift of sensor data from the origin is proportional to the magnitude of the change in vehicular magnetism.

The compass system of the above-mentioned patent provides automatic and continuous calibration to account for changes in the vehicle's magnetism, and thus the system's reaction to the earth's magnetic field during the life of the vehicle. The calibration system includes means for testing the data received from the compass sensor to determine the maximum and minimum signal levels during movement of the vehicle through a completed 360° path of travel however circuitous the path may be. This data is averaged over several such paths of vehicular travel to provide continuously updated and averaged compensation correction information. The automatic and continuous calibration is capable of correcting the compass system when the plot of sensor data experiences small shifts away from the origin of the coordinate plane due to small drifts in vehicular magnetism. The origin of the coordinate plane in these circumstances is still contained within the circle plotted when the vehicle travels a 360° loop, and the crossings of the sensor data on the axes of the coordinate plane are used to calculate the spans of the signal levels along each axis which determine the center of the circular plot of sensor data. Compensation signals are then generated based on the difference between the center of the circle and the origin of the coordinate plane. However, if the shift of sensor data is large enough such that the origin of the coordinate plane is not contained within the circular plot of sensor data created when the vehicle travels a 360° loop, then heading information cannot Le calculated and the calibration system cannot provide correction in this somewhat unusual situation unless the sensor data experiences a subsequent shift that causes the origin of the coordinate plane to again be contained. Because such a subsequent shift may never occur or, if it does, may occur only after an undesirably long period of time, the compass system of the above-mentioned patent provides means to reinitiate calibration in these situations.

Reinitiation of calibration involves the collecting and centering of spans of sensor data followed by the collecting and centering of two circles of sensor data, which causes the origin of the coordinate plane to coincide with the center of the circular plot of sensor data. As such, the reinitiation process enables the compass system to recover from any change in vehicular magnetism and to provide accurate heading information. In order to detect situations where reinitiation of the calibration system is desirable, it is known to have the compass system maintain saturation limits at the outer boundaries of the range of measurement of the sensor data. For 8-bit sensor data, these saturation limits are at 0 and 255, as shown in FIG. 1. If a large change in vehicular magnetism causes the sensor data to shift and the current data is plotted outside of these limits for a continuous period of five minutes, then calibration is restarted. Such a shift is shown by graph C of FIG. 2, with the dashed portion thereof indicating the range of heading directions of the vehicle that would cause the sensor data to remain outside of the saturation limits. However, intermediate changes in vehicular magnetism are possible which, while causing the plot of sensor data to shift and to not contain the origin of the coordinate plane when the vehicle completes a 360° loop, do not cause the sensor data to be plotted outside of the saturation limits. Such a shift is shown by graph D of FIG. 3. As such, it is known to also provide for a reinitiation of calibration if 15 ignition cycles of at least 5 minutes duration are completed without obtaining a crossing point on the axes of the X-Y coordinate plane. Furthermore, it is known to enable the operator of the vehicle to manually reinitiate calibration by operating a switch, button, or the like. Manual reinitiation would most likely occur when the operator notices that the displayed heading information is erroneous for an extended period of time. Although the above-mentioned means by which to cause reinitiation of calibration enables the compass system to ultimately recover from changes in vehicular magnetism of any magnitude, such reinitiation is considered a rather extreme measure since it requires the clearing of all prior sensor readings and calibration data. Thus, until sufficient data is collected to calibrate the system, the system operates in an uncalibrated state.

Although this system is a substantial improvement in vehicle compass operation and provides more accurate heading information over differing operating conditions, its somewhat lengthy averaging process and method of gradual compensation makes it primarily suited for the compensation of slow and gradual changes in vehicular magnetism. As such, this compass system may be unable to adequately compensate for and recover from an abrupt and significant change in vehicular magnetism caused by, for example, driving the vehicle near the electrical power feeders of train or subway systems. Thus, such an event may cause a substantial impairment of compass operation resulting in at least short-term erroneous heading information to be displayed until recalibration or reinitialization of the system is achieved.

Further, a particular problem with vehicular magnetism exists before sale of a new vehicle to a customer. At this time, the vehicle may be substantially magnetized due to either the manufacturing process or the method of delivery of the vehicle to the dealer. In order to ensure that the compass system is providing accurate heading information upon initial power-up by the customer, changed or existing vehicular magnetism must be compensated for or eliminated. The means chosen to perform this function should be easy and efficient so that servicing of the vehicle is avoided and should be capable of being performed either at the factory or at individual dealerships. Although factory compensation of a new vehicle's compass has been standard practice for many years, current methods have proven to be inadequate. For example, eliminating the magnetism requires special degaussing equipment that is very expensive, and assigning the duty of manual calibration to the manufacturer or to individual dealers is problematic. One method of compass compensation at the factory involves identifying the magnetic field at a particular-location and, when the vehicle is positioned in a predetermined direction at this location, providing calibration signals to correct for any differences in the displayed heading and the known heading for the existing magnetic field at said position along the assembly line. This method is problematic in that a magnetically stable location may be impossible to maintain in a factory environment due to the possibility of stray or changing magnetic fields and disturbances which would potentially cause miscalibration of the compass resulting in erroneous heading information being displayed.

The compass system disclosed in commonly assigned U.S. Pat. No. 5,737,226, entitled VEHICLE COMPASS SYSTEM WITH AUTOMATIC CALIBRATION, issued on Apr. 7, 1998, operates substantially similar to that in the above-described U.S. Pat. No. 4,953,305, except that it utilizes a modified control program that calibrates the compass system utilizing only two averaged data points and one raw data point obtained from travel of the vehicle in less than a complete closed loop for purposes of calibrating the compass system during initialization following manufacture and at such times that the compass system determines that the obtained sensor data falls outside the saturation thresholds that previously required reinitialization of the compass system. Thus, the compass system disclosed in U.S. Pat. No. 5,737,226 allowed the compass system to become calibrated much more quickly following manufacture and to recover more quickly when the sensor data is detected as being outside the saturation threshold limits.

The manner by which the compass system disclosed in U.S. Pat. No. 5,737,226 recalibrates itself by identifying the center of a circular plot of data is described below with reference to FIG. 4. When a vehicle maces a slight turn, the data obtained from the sensors may take the form of the arc shown when plotted relative to Cartesian coordinates. The starting point T of the arc shown corresponds to the output of the sensors obtained just prior to the vehicle starting the turn. As the vehicle makes a turn, intermediate raw data points, such as point U, are read from the sensors. At the completion of the turn, the data point derived from the sensor output signals would correspond to ending point V. To perform a calculation of the center W of the arc (or center of circle F), it is desirable that starting point T and ending point V are data points in which there is a fair to high level of confidence in their accuracy. Such confidence in the data points may be present when the sensor outputs remain at a constant level for a predetermined period of time as would be the case when the vehicle is traveling straight. The center W of the plotted arc is calculated by assuming a predetermined value for the radius r and identifying the two points that are a distance r from both starting point T and ending point V. To discriminate between the two points thus obtained, an intermediate raw data point U is referenced, since the true center point will be that which is farthest away from intermediate point U.

To ensure at least a minimal amount of accuracy, the compass system will not recalibrate using two data points that are less than a predetermined distance a away from one another. This predetermined distance criterion represents a trade-off between accuracy and rapid calibration. Because the disclosed compass system subsequently utilizes the averaged data obtained using the calibration technique disclosed in U.S. Pat. No. 4,953,305, the sacrifice of accuracy only temporarily affects the compass system.

Although the above compass system solves some of the problems associated with the compass system disclosed in U.S. Pat. No. 4,953,305, it does not increase the speed at which the compass system compensates for less significant changes in vehicular magnetism. For example, so long as the signals from the sensors do not exceed the saturation threshold but nevertheless exhibit a change in vehicular magnetism, the compass system disclosed in U.S. Pat. No. 5,737,226 would rely upon the calibration technique disclosed in U.S. Pat. No. 4,953,305, whereby the center of the new circle would not be obtained until the vehicle travels through a complete new 360° loop. Further, in such an event, the center of the new circle would be averaged with that of the prior circle thereby further slowing down the responsiveness of the compass system to such abrupt and less significant changes in vehicular magnetism.

Because compass systems employing magnetic-inductive sensors do not require the use of the analog-to-digital converters utilized by compass systems having flux-gate or magneto-resistive sensors, magneto-inductive compass systems are not confined by the saturation limits or dynamic range of an analog-to-digital converter. Thus, if the calibration technique disclosed in U.S. Pat. No. 5,737,226 were implemented in a magneto-inductive compass system, the sensor outputs would never exceed in a saturation threshold and thus the quick calibration technique employing two points of data would not be used even when the changes in vehicular magnetism are significant.

U.S. Pat. No. 4,807,462 also discloses a compass system that recalibrates itself using data obtained during such time that the vehicle travels in less than a complete 360° loop. As illustrated in FIG. 5, the compass system disclosed in this patent calculates the center of a circle utilizing three data points. In particular, this compass system determines the coordinates $(X_0, Y_0)$ of the center of the circle by determining the coordinates of the intersection point of perpendicular bisectors of lines drawn between the first and second data points and between the second and third data points. This compass system recalculates the center of the circle each time a new data point is detected. When a new data point is detected, the compass system utilizes this new data point with the two most recent of the prior three data points. Thus, this system continuously calibrates using just three data points. Because this compass system does not establish any criterion for accepting data points used to calculate the center of the circle, and because this system apparently throws out the previously calculated center point each time a new center point is calculated, the system is not very accurate. For example, if a newly obtained data point is off-set from the prior circle due to travel across railroad tracks, the compass system will become improperly calibrated based upon this one inaccurate data point.

Thus, there exists a need for a compass compensation system capable of more accurately compensating for and recovering from abrupt changes in vehicular magnetism regardless of the significance of the change and having the capability to more efficiently and more accurately compensate for the initial vehicular magnetism of a new vehicle.

SUMMARY OF THE INVENTION

Accordingly, it is an aspect of the present invention to solve the above problems and satisfy the above-noted needs. A more specific aspect of the present invention is to provide an electronic compass system that recalibrates in a manner that is more responsive to sensed changes in vehicular magnetism. An additional aspect of the present invention is to provide an electronic compass system that accurately calibrates itself initially and continuously thereafter using only three points of data derived from the sensor output signals. Yet another aspect of the present invention is to provide an electronic compass calibration process that fully utilizes the dynamic range available when magneto-inductive sensors are utilized. Still another aspect of the present invention is to provide a compass calibration system that establishes acceptance criteria for the three points of data obtained from the sensors and used for calibration so as to ensure a sufficient degree of accuracy of the compass system.

To achieve these and other aspects and advantages, the electronic compass system of the present invention comprises a magnetic field sensor for detecting the earth's magnetic field and for generating electrical signals representing the direction of the vehicle's travel in relation to the earth's magnetic field, and a processing circuit coupled to the sensor for processing the electrical signals generated by the sensor to provide a vehicle direction output signal representative of the vehicle's current heading. The processing circuit processes the electrical signals generated by the sensor by translating the electrical signals into data points represented by their coordinates with respect to an origin. The processing circuit calibrates the system by recalculating coordinates of a center point of a circle defined by a plot of the data points that are derived as the vehicle travels through a non-linear path and determining offset compensation corresponding to the offset of the center of the circle with respect to the origin. The processing circuit calibrates the system when three data points are detected that define corners of a triangle meeting predetermined criteria.

Preferably, the processing circuit determines that a triangle defined by the three data points meets the predetermined criteria when the triangle is substantially non-obtuse. The processing circuit preferably determines that the three points of data define corners of a substantially non-obtuse triangle by computing the lengths of the sides of such a triangle and determining whether the relationship of the lengths of the sides satisfy the relationship $\sqrt{a^2+b^2}/c \geq 0.92$. The processing circuit preferably calculates the center point coordinates by solving the equation $x^2+y^2+Ax+By+C=0$ for A, B, and C using the coordinate values (x, y) for the three data points, and defining the center point as $(-A/2, -B/2)$.

These and other features, advantages, and objects of the present invention will be further understood and appreciated by those skilled in the art by reference to the following specification, claims, and appended drawings.

BRIEF DESCRIPTION OF THE DRAWING

In the drawings:

FIG. 12 is a state table showing the outputs of the state machine for each operating state;

DETAILED DESCRIPTION OF THE PREFERRED EMBODIMENT

Overview

Figure 1:
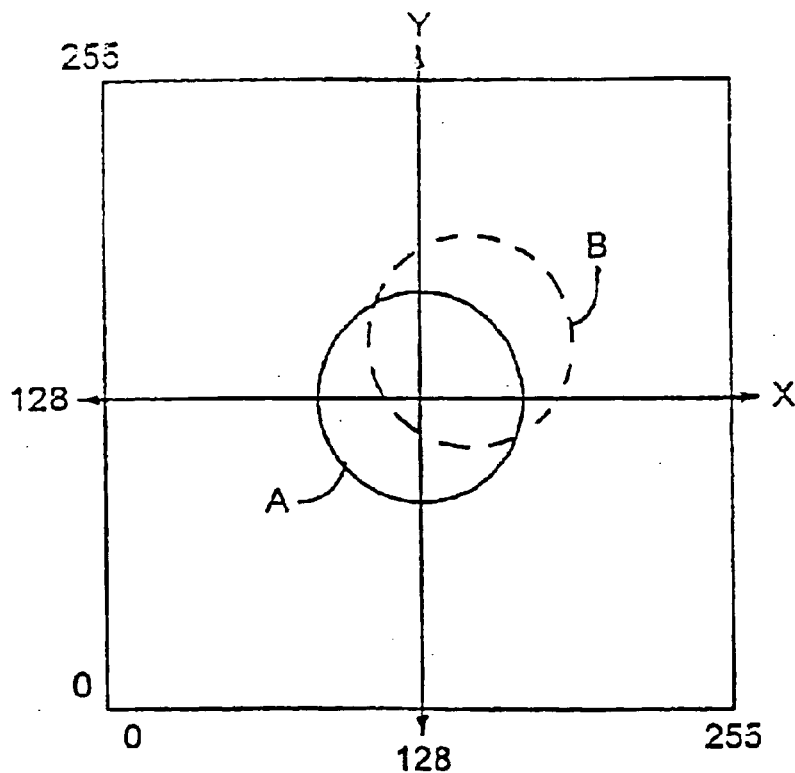
FIG. 1 is a graph illustrating the ideal signal representing the sensed magnetic field of the earth when the vehicle travels in a 360° loop, and the signal after a change in vehicular magnetism.
Figure 2:
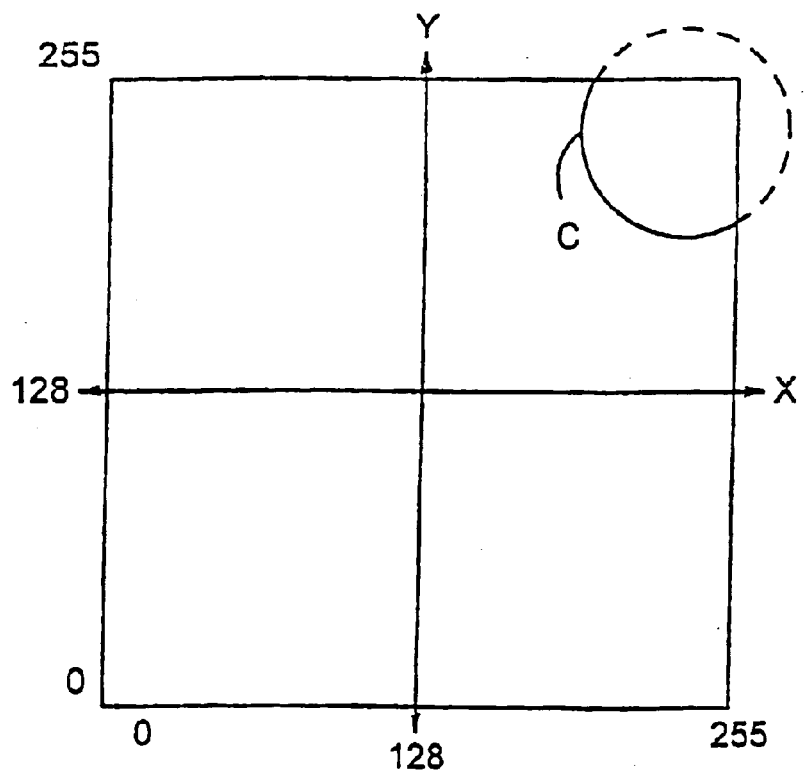
FIG. 2 is a graph illustrating the signal representing the sensed magnetic field of the earth after a large change in vehicular magnetism causing the saturation limits of a compass utilizing either flux-gate or magneto-resistive sensors to be exceeded.
Figure 3:
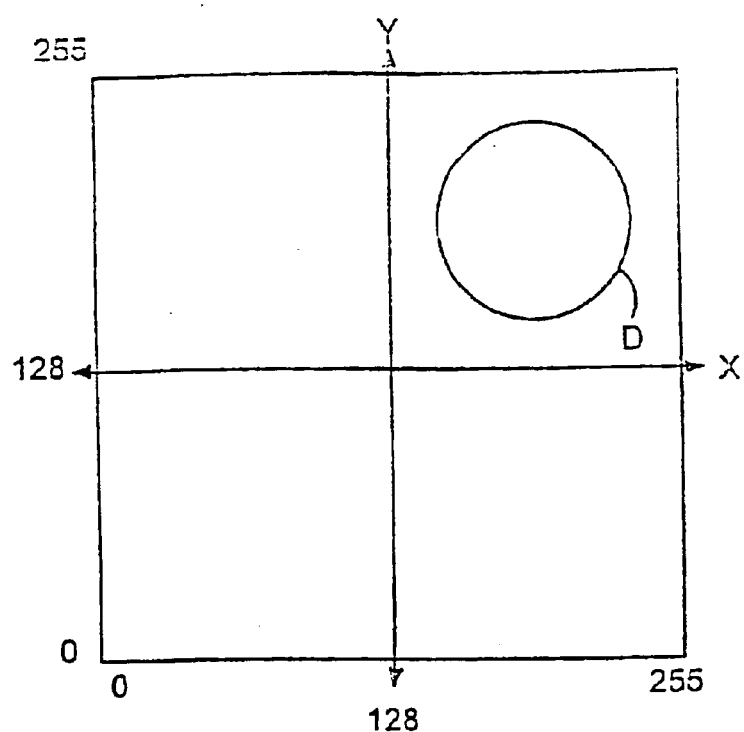
FIG. 3 is a graph illustrating the signal representing the sensed magnetic field of the earth after an intermediate change in vehicular magnetism.

The present invention relates to the manner in which a compass processor processes raw data obtained from magnetic field sensors and calibrates the system so as to generate an output signal representing the vehicle's current heading. As will be described in more detail below following the description of the compass system hardware, the compass processor continuously calibrates by continuously recomputing the center of a circular plot of data based upon three processed data points. More specifically, the processor translates the electrical signals supplied from the sensors into raw data points, filters and averages the raw data points, and plots three averaged and filtered data points meeting specified criteria as a first candidate data point $(x_1, y_1)$, a second candidate data point $(x_2, y_2)$, and a third candidate data point $(x_3, y_3)$. The processor then solves the three equations below to determine the values for A, B, and C:

$$x_1^2 + y_1^2 + Ax_1 + By_1 + C = 0$$

$$x_2^2 + y_2^2 + Ax_2 + By_2 + C = 0$$

$$x_3^2 + y_3^2 + Ax_3 + By_3 + C = 0$$

The processor next defines the center point of the circle defined by the three data points as $(-A/2, -B/2)$ and defines the radius (r) of the circle as $r = \sqrt{(A^2 + B^2 - 4C)/4}$.

Because the calibration of the compass is dependent upon each calculation of the center of the circle, the compass processor subjects the raw data obtained from the sensors to certain raw data filtering processes and then averages a predetermined number of the processed and filtered raw data to obtain averaged data points. This averaged data is then subjected to filtering to obtain filtered averaged data. The processor then determines whether the filtered averaged data meets predetermined criteria to qualify as one of three candidate data points that are used to calculate the center of a new circle. One criterion the processor applies to the three candidate data points thus obtained is to determine whether the triangle that is defined by the three candidate data points is an obtuse triangle. In general, if the triangle is an obtuse triangle, the compass processor will not use these three candidate data points to calculate the center of a new circle, but will continue to obtain new filtered averaged data points until three points are detected that define a non-obtuse triangle. The specific manner by which the compass processor filters and processes the raw data to identify averaged data points, and the specific manner by which the processor filters and applies various criteria to the averaged data points, are defined in more detail below following a description of the compass system hardware.

Although the preferred embodiment implements the processing and calibration techniques of the present invention in a compass system utilizing magneto-inductive sensors, the calibration and processing techniques of the present invention may also be employed in compass systems utilizing flux-gate or magneto-resistive sensors. To enable a more complete understanding of the detailed manner by which a compass processor performs the calibration and processing techniques of the present invention, a detailed description of the compass system hardware is first described followed by the more detailed description of the processing of the raw data obtained using the exemplary hardware described below.

Compass System Hardware

Figure 7:
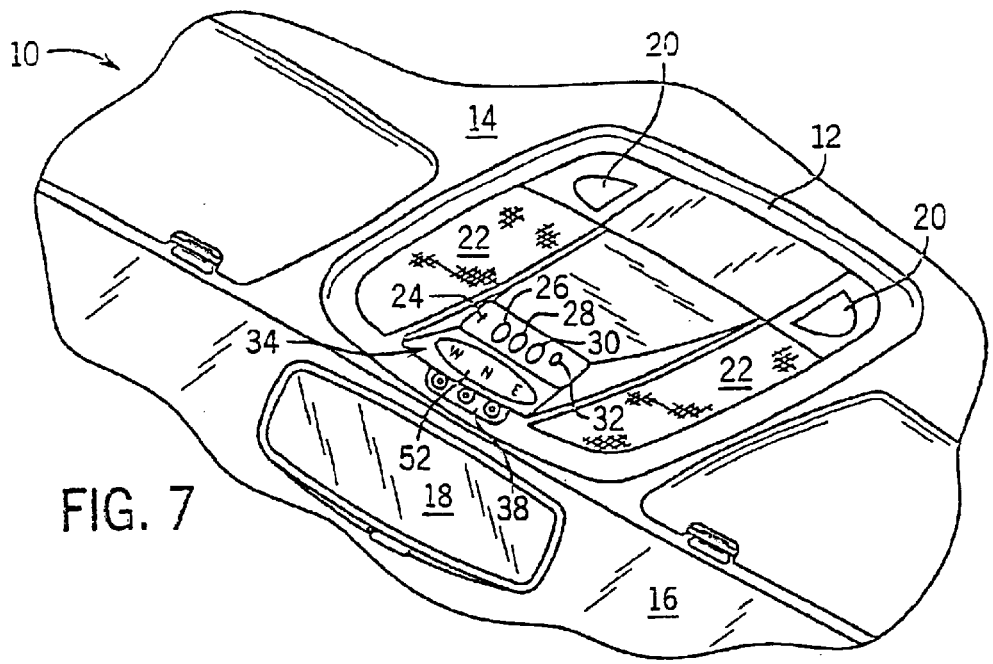
FIG. 7 is a fragmentary perspective view of a vehicle embodying the present invention.

In FIG. 7, there is shown a vehicle 10 such as an automobile which includes an overhead console 12 mounted to the roof 14 of the vehicle during manufacture, although it could be separately added at a later time. Console 12 is centered near the top edge of windshield 16 typically above the rearview mirror 18 and includes a pair of switches 20 for operating lamps positioned behind lenses 22 which in turn direct illumination into the lap area of either the driver or passenger side of the vehicle depending on which switch is actuated. The center of the console includes a trainable garage door opening transmitter 24 of the type disclosed in commonly assigned U.S. Pat. No. 5,614,891, entitled VEHICLE ACCESSORY TRAINABLE TRANSMITTER, and issued on Mar. 25, 1997. This trainable transmitter can learn the RF frequency, modulation scheme, and security code for up to three existing remote transmitters. Thus, console 12 including trainable transmitter 24 can replace three separate remote control transmitters usually loosely stored in the vehicle. The transmitter includes three control switches 26, 28, and 30, and an indicator LED 32 for the display of training prompting and operating information to the vehicle operator. Console 12 also includes a display panel 34, the center of which includes a digital display 52 providing, in one embodiment of the invention, a 16-point compass display of the vehicle heading. Console 12 also includes display control buttons 38 for selecting information to be displayed. Also mounted in console 12 is the compass circuit shown in FIG. 8.

Figure 8:
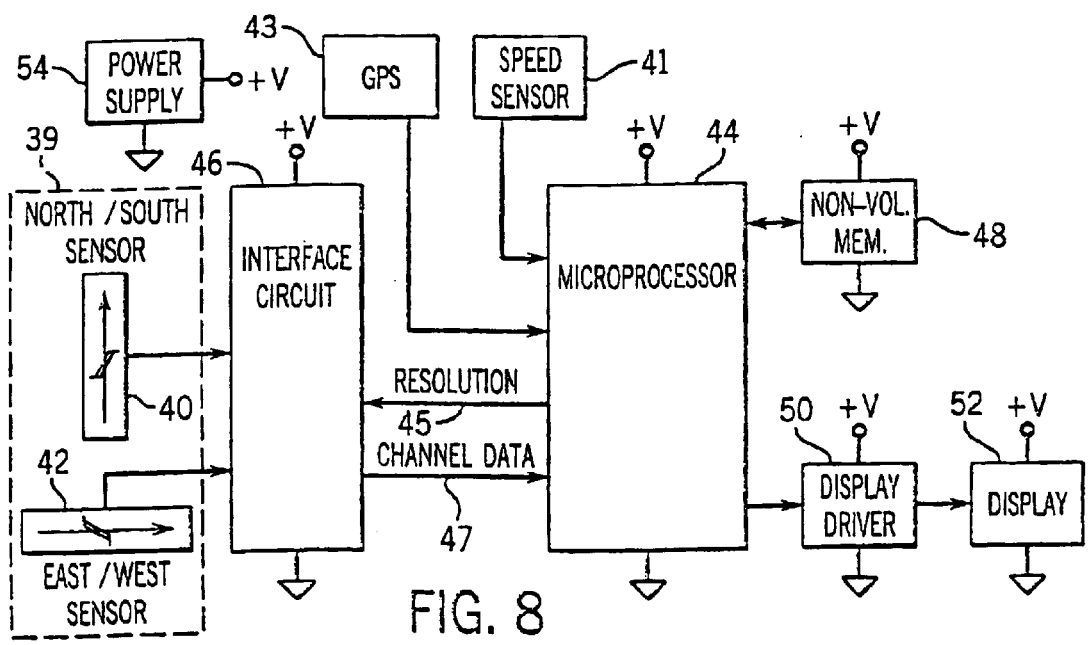
FIG. 8 is an electrical circuit diagram in block form of the compass system embodying the present invention.

Referring now to FIG. 8, the compass system of the present invention includes a magnetic field sensor 39 coupled to a microprocessor 44 through an electrical interface circuit 46. In the preferred embodiment, sensor 39 is comprised of individual sensors 40 and 42 which sense separate orthogonal components of the earth's magnetic field, and microprocessor 44 is a HC05 8-bit microprocessor manufactured by the Motorola Corporation. Microprocessor 44 and circuit 46 are coupled via serial communication lines 45 and 47, and comprise a processing circuit for processing electrical signals supplied from sensors 40 and 42. Also coupled to microprocessor 44 in a conventional manner is a non-volatile memory circuit 48 for storing compass data, a speed sensor 41, a GPS device 43, a display driver 50, and a display 52 for displaying heading information to the operator of the vehicle. Power supply circuit 54 provides operating voltage to the various electrical components of the compass system. The functioning and interconnection of these circuits is now described in greater detail.

Magnetic field sensors 40 and 42 sense the horizontal components of the magnetic field external to the vehicle. Sensor 42 senses the east/west or Channel 1 components of the field, and sensor 40 senses the north/south or Channel 2 components of the field. As is described below, the magnetic field sensed by sensor 40 is said to have a positive polarity if it is in the north direction, and is said to have a negative polarity if it is in the south direction. Similarly, the magnetic field sensed by sensor 42 is said to have a positive polarity if it is in the east direction, and is said to have a negative polarity if it is in the west direction. Although the reference to the sensing directions of the sensors as being north, south, east, and west is literally accurate only when the vehicle is traveling north, these relative terms referring to direction are utilized hereinafter to refer to the component directions of the sensed eternal magnetic field. For example, sensor 40 is oriented to sense the component of the earth's magnetic field existing along an axis corresponding to the vehicle's direction of travel, and sensor 42 is oriented to sense the component existing in a direction perpendicular to the vehicle's direction of travel.

In the preferred embodiment, sensors 40 and 42 are magneto-inductive sensors, each having a wire-wound high magnetic permeability core constructed of Metglas 2705 M available from Allied Signal Corporation. Preferably, the core has dimensions of 0.020 inch×0.600 inch×0.001 inch, and is wound with approximately 2000 turns of 41 gauge AWG wire. As described in greater detail below, sensors 40 and 42 of the preferred embodiment serve as inductive elements in an oscillator circuit formed with portions of interface circuit 46, with the inductance of a particular sensor being dependent on the magnitude of the magnetic field in that sensor's direction of measurement. Through the generation of electrical signals having a frequency that varies with the external magnetic field, the vehicle direction can be ascertained. Although sensors 40 and 42 are magneto-inductive sensors in the preferred embodiment, other types of sensors, such as magneto-resistive sensors, can be implemented if appropriate changes are made to the compass system. Sensors 40 and 42 may also be replaced by a flux-gate sensor or magneto-resistive sensor.

Figure 9:
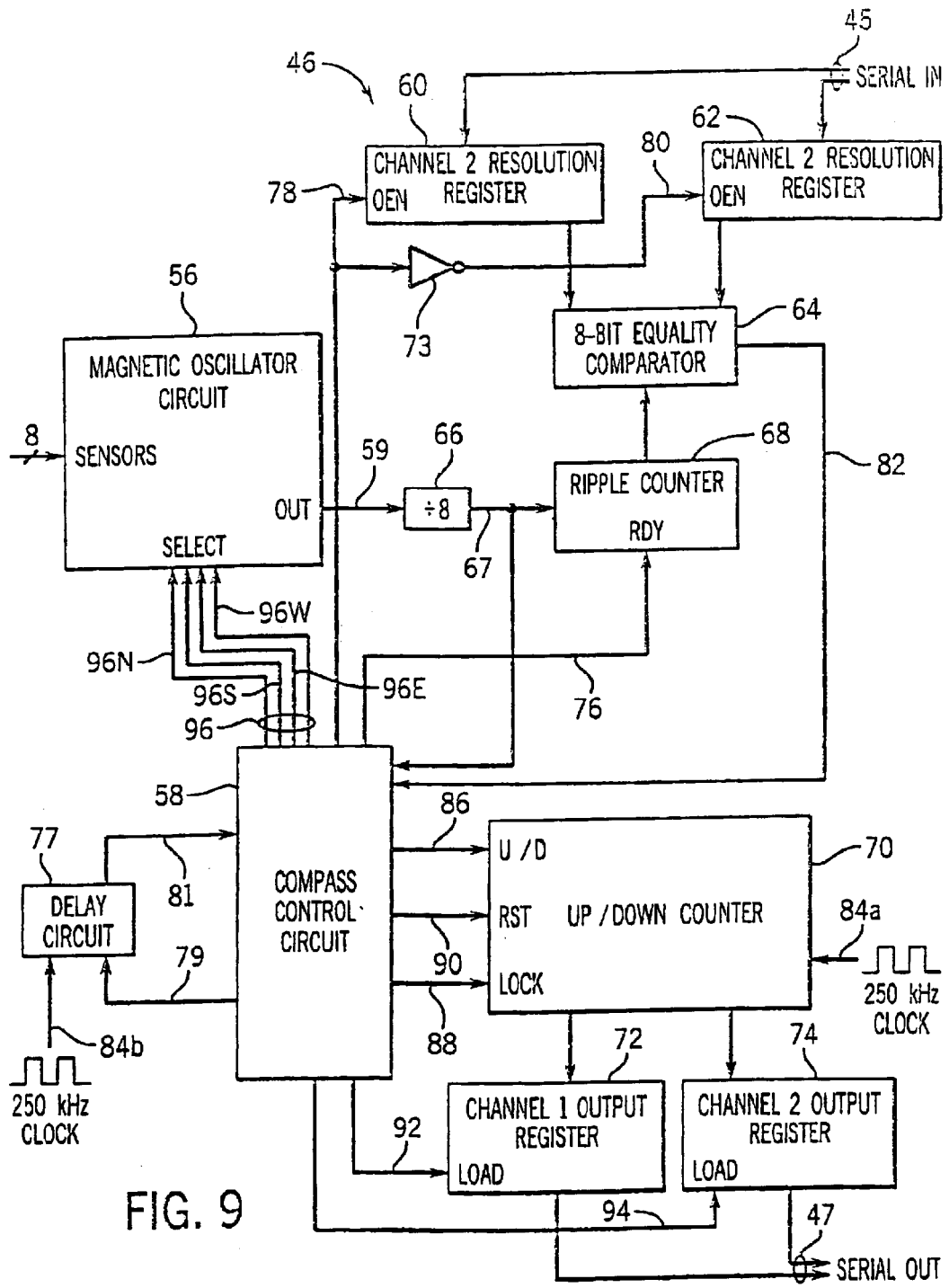
FIG. 9 is an electrical circuit diagram in block form of the interface circuit shown in FIG. 8.

Shown in FIG. 9 is interface circuit 46, which couples magneto-inductive sensors 40 and 42 to the microprocessor 44. In the preferred embodiment, circuit 45 includes a driver circuit 56, a compass control circuit 53, an 3-bit Channel 1 resolution resister 60, an 8-bit Channel 2 resolution register 62, an 8-bit equality comparator 64, a division circuit 66, an 8-bit ripple counter 68, a 16-bit up/down counter 70, a 16-bit Channel 1 output register 72, and a 10-bit Channel 2 output register 74. The functioning and interconnection of these circuits is now described in greater detail.

Figure 10:
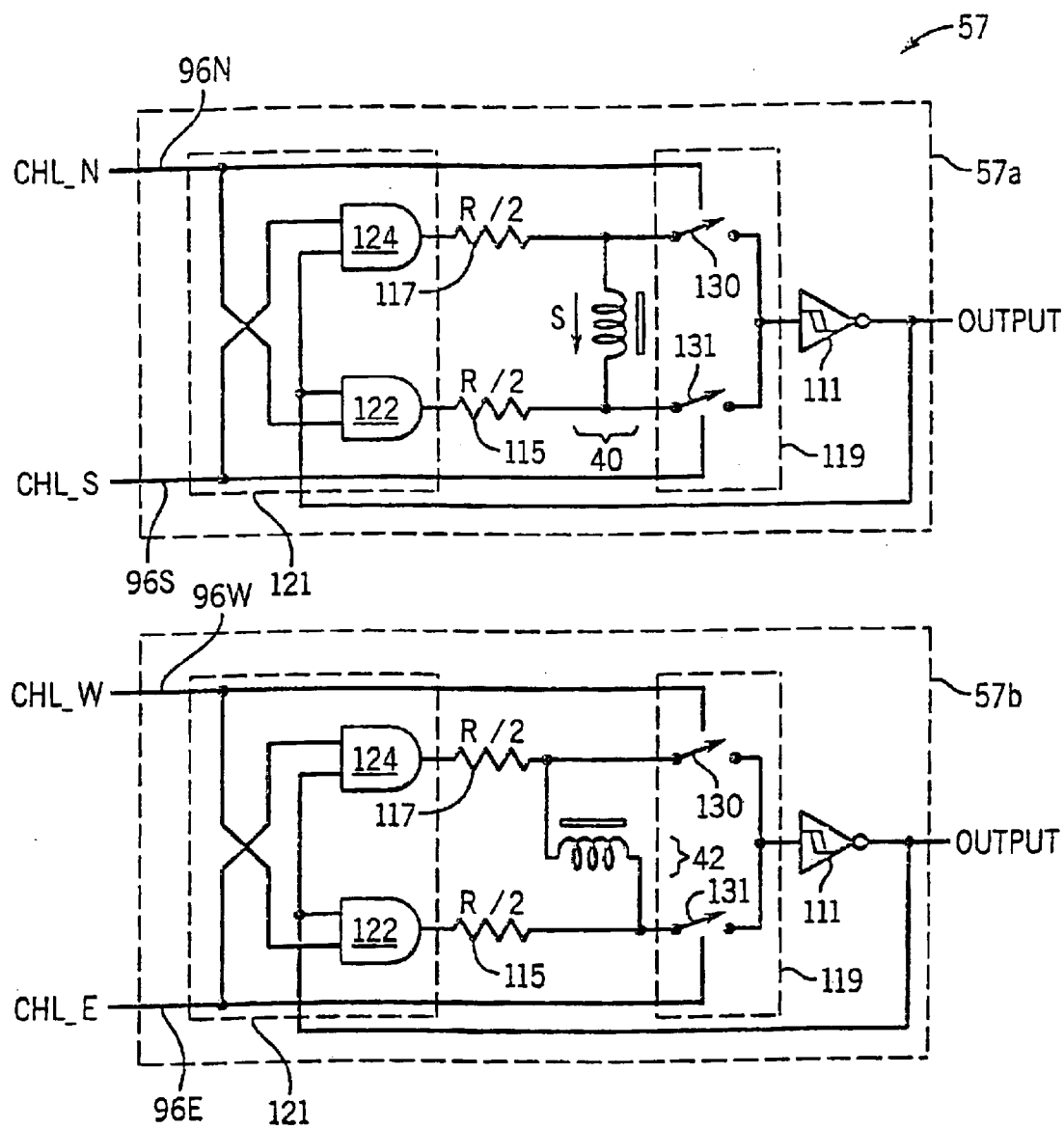
FIG. 10 is an electrical circuit diagram in schematic form of an exemplary oscillator used in the interface circuit shown in FIG. 9.

Driver circuit 56 of interface circuit 46 and sensors 40 and 42 form an oscillator 57 in which sensors 40 and 42 serve as inductive elements and from which electrical signals are generated which represent the sensed magnetic field external to the vehicle. The structure of such a circuit is shown in FIG. 10 and disclosed in U.S. Pat. No. 5,239,264, issued on Aug. 24, 1993, entitled ZERO-OFFSET MAGNETOMETER HAVING COIL AND CORE SENSOR CONTROLLING PERIOD OF AN OSCILLATOR CIRCUIT, assigned to Precision Navigation, Inc., the disclosure of which is incorporated herein by reference. A brief description of the functioning of this circuit in connection with the other components of interface circuit 46 is now provided.

In order to obtain compass heading information, the output frequency of oscillator circuit 57 is dependent on the level of internal inductance of the sensors. Oscillator circuit 57 is configured such that each of sensors 40 and 42 serves as the inductive element of circuit 57 at alternating times as described in the above-mentioned patent. The level of inductance provided by sensors 40 and 42, and thus the output frequency of circuit 57, are dependent on the magnitude and direction of the external magnetic field as well as the direction of the magnetic field created by the current fed to the sensor. As shown in FIG. 10, oscillator 57 includes a channel oscillator 57a for driving sensor 40 and a channel sensor 57b for driving sensor 42. Each channel oscillator 57a, 57b preferably includes a gating element 121 having AND gates 122 and 124 with inputs connected to the output of the channel oscillator and respective input enable lines 96N, 96S, 96E, and 96W that are coupled to compass control circuit 58. The outputs of AND gates 122 and 124 are respectively coupled to different ends of the sensors (40, 42) through impedance matched timing resistors 115 and 117. The two ends of each sensor 40, 42 are also connected to the input of a Schmitt trigger 111 via normally open switches 130 and 131, respectively. Switches 130 and 131 are independently controlled by the enable signals output from compass control circuit 58. By closing switches 130 and 131 one at a time, compass control circuit 53 changes the bias polarity of the channel oscillators 57a and 57b causing the channel oscillators to change the end of the sensor to which a driving current is supplied. The bias polarity of channel oscillator 57a is deemed to be positive if it is biased to apply current to the north end of sensor 40, and is negative if it is biased so as to apply current to the south end of sensor 40. Similarly, the bias polarity of channel-oscillator 57b is deemed to be positive if it is biased to apply current to the east end of sensor 42, and is negative if it is biased so as to apply current to the west end of sensor 42. As shown in FIG. 10, oscillator 57 is configured so that each of sensors 40 and 42 can be fed current from either of their ends. The detailed operation of oscillator 57 is described in U.S. Pat. No. 5,239,264.

The frequency of the signal output from oscillator circuit 57, which is dependent on the magnitude and direction of the external magnetic field and the bias polarity of the channel oscillator connected therein, has a base or zero magnetic field frequency when no magnetic field is present in the measurement direction of the connected sensor. With a positive bias polarity of channel oscillator 57a, the output frequency of oscillator 57 decreases from this base frequency when the magnetic field strength increases in the north (positive) direction, and increases from the base frequency when the magnetic field strength increases in the south (negative) direction. If the bias polarity of channel oscillator 57a is negative, then the output frequency of oscillator 57 increases from the base frequency when the magnetic field strength increases in the north (positive) direction, and decreases from the base frequency when the magnetic field strength increases in the south (negative) direction. When channel oscillator 57b has a positive bias polarity, the output frequency of oscillator 57 decreases from the base frequency when the magnetic field strength increases in the east (positive) direction, and increases from the base frequency when the magnetic field strength increases in the west (negative) direction. If the bias polarity of channel oscillator 57b is negative, then the output frequency of oscillator 57 increases from the base frequency when the magnetic field strength increases in the East (positive) direction, and decreases from the base frequency when the magnetic field strength increases in the West (negative) direction. Thus, by analyzing the output frequency of oscillator circuit 57 when a channel oscillator is biased at a known bias polarity and comparing that frequency to the base frequency, compass heading information may be obtained.

Interface circuit 46 analyzes the electrical signals provided by oscillator circuit 57 by determining for each channel oscillator a frequency difference between signals output from oscillator 57 for each different bias polarity. Specifically, interface circuit 46 measures the output frequency by converting the electrical signals into data signals and determining the time period measured as the number of fixed duration "counts" required for the signals from oscillator circuit 57 to complete a particular number of cycles. The count value increases as the frequency of oscillation decreases. For each channel, interface circuit 46 measures the number of counts required for signals output from circuit 57 to complete a particular number of cycles for each bias polarity of the corresponding channel oscillator and determines a difference in the number of counts associated with the two different bias polarities of the corresponding channel oscillator. By calculating the difference between the count values associated with the positive and negative bias polarities of each channel oscillator, a zero-compensated count value, or data signal, is generated for each sensor. Such a count value represents the actual field strength in the measurement direction of a sensor and is zero if the magnetic field is zero. As described in greater detail below, each count of these zero-compensated count values represents a particular level of magnetism, with the milligauss to count ratio of a count value determined by the number of cycles completed by oscillator circuit 57 for both bias polarities of the channel oscillator generating that zero-compensated count value. A description of the individual components of interface circuit 46 to implement the bias polarity switching method is now described.

Referring to FIG. 9, Channel 1 resolution register 60 is an 8-bit register that stores a value which determines the number of cycles to be completed by the output signal of oscillator circuit 57 for the measurement period of each bias polarity of channel oscillator 57b. Similarly, Channel 2 resolution register 62 is an 8-bit register that stores a value which determines the number of cycles to be completed for the measurement period of each bias polarity of channel oscillator 57a. As described below, these values determine the level of resolution achieved by the compass system and may be adjusted by microprocessor 44 by means of adjustment signals via input line 45. Division circuit 66 receives the electrical signal generated by oscillator circuit 57 via line 59 and divides this signal by a particular number (8 in the preferred embodiment). The resulting signal is supplied to ripple counter 68 via line 67. Ripple counter 68 is an 8-bit counter that counts the number of cycles completed by the input signal received from division circuit 66. As described below, counter 68 counts the number of cycles completed for each bias polarity of the channel oscillators for each of sensors 40 and 42, with the counter being cleared before each counting period by means of connection to compass control circuit 58 via line 76. The electrical signal generated by oscillator circuit 57 is divided by circuit 66 before being input to counter 68, thus dividing the frequency of the signal by 8 (in the preferred embodiment), because it is desirable to enable 8-bit ripple counter 68 (capable of counting to 255) to count more than the equivalent of 255 cycles of the original electrical signal. By counting more cycles, counter 68 enables the compass system to work with more averaged sensor information which is more reliable.

Equality comparator 64 of FIG. 9 is an 8-bit comparator which compares the value of ripple counter 68 with the stored value of whichever one of resolution registers 60 or 62 is enabled by compass control circuit 58 via lines 78 or 80. If the two compared values are equal, comparator 64 outputs a signal (REQUAL=1) to compass control circuit 58 via line 82. Up/down counter 70 is a 16-bit counter that serves to calculate the time period or count value required for a particular number of cycles to be completed by the output signal from oscillator circuit 57 which is eventually indicated by an output signal (REQUAL=1) from equality comparator 64 sent to circuit 53. As described below, counter 70 ultimately holds the difference between the count values measured during the two bias polarities of the channel oscillator for a particular sensor. Via input line 84, counter 70 counts according to a clock signal having a frequency which is selected such that counter 70 will not roll over (count beyond its measurement range) when making its time period calculations. In the preferred embodiment, the clock frequency is 250 kHz. The counting of counter 70 is controlled by its multiple connections with compass control circuit 58, with a signal (U/D) applied on the U/D input line 86 determining whether counter 70 counts up or down, a signal (ENABLE) applied on the Lock input line 88 enabling counter 70 to be locked at a particular measurement reading (for reasons discussed below), and a signal (CLEAR) applied to the RST input line 90 enabling counter 70 to be cleared. Channel 1 and Channel 2 output registers 72 and 74 are 16-bit registers and, depending on which is enabled by compass control circuit 58 via a signal (Latch_N) on line 92 or a signal (Latch_E) on line 94, one receives and stores the count value held in counter 70. This zero-compensated count value, or data signal, is available to microprocessor 44 via output line 47. Compass control circuit 58 is configured as a conventional state machine and controls the functioning of interface circuit 46. Using known software, those skilled in the art may readily determine the appropriate configuration of the state machine based upon the state diagram shown in FIG. 11 and the state table shown in FIG. 12. In addition to its connections described above, circuit 58 enables oscillator circuit 57 to cycle through each of its four modes of operation (positive and negative oscillation polarities of each of sensors 40 and 42) by means of connection to SELECT input lines 96 of device, circuit 56. The operation of compass control circuit 53 is now described with reference to FIGS. 11 and 12.

In operation, compass control circuit 58 of interface circuit 46 initiates a measurement of the external magnetic field by causing oscillator circuit 57, via SELECT line 96, to enter its first mode of operation. Although either of sensors 40 and 42 may be connected to oscillator circuit 57 in the first mode, let us assume that the first mode of operation involves sensor 40 (Channel 2). In this first state designated as "0000" in FIG. 11, compass control circuit 58 outputs the control signals shown for that state in the state table shown in FIG. 12. Specifically, circuit 58 outputs a signal (INDELAY=0) to a delay circuit 77 via line 79. Delay circuit 77 supplies a signal (ODELAY=0) to circuit 58 via line 81 until it counts a predetermined number of clock pulses of a 250 kHz clock signal applied to delay circuit 77 via line 84b. In state 0000, circuit 58 enables channel oscillator 57a with a positive bias by applying a signal (CHL_N=1) via line 96N. In addition, compass control circuit 58 causes ripple counter 68 to be cleared by applying a signal (RCLEAR=1) via line 76, enables up/down counter 70 by applying a signal (ENABLE=1) on line 88, causes counter 70 to enter the "counting up" mode of operation by supplying a signal (U/D=0) via line 86, and enables Channel 2 resolution register 62 by applying an inverted signal (RENABLE_E=

0) via an inverter 73 and line 80 (while maintaining Channel 1 resolution register 60 in a disabled state by supplying the non-inverted signal (RENABLE_E=1) via line 78). When delay circuit 77 reaches the predetermined count level, it supplies a signal (ODELAY=1) to circuit 58 via line 81. Upon receiving the signal (ODELAY=1) from delay circuit 77, circuit 58 enters a second state designated as "0001" in FIG. 11. In this second state, circuit 58 outputs e control signals shown for this state in state table (FIG. 12). In this second state, circuit 58 releases ripple counter 68 to start counting by supplying a signal (RCLEAR=0) via line 76 and resets and holds delay circuit 77 by supplying a signal (INDELAY=1) via line 79. Circuit 58 remains in this second state only until a first pulse (MAG_OSC=1) is detected as being output from dividing circuit 66 on line 67.

Figure 5:
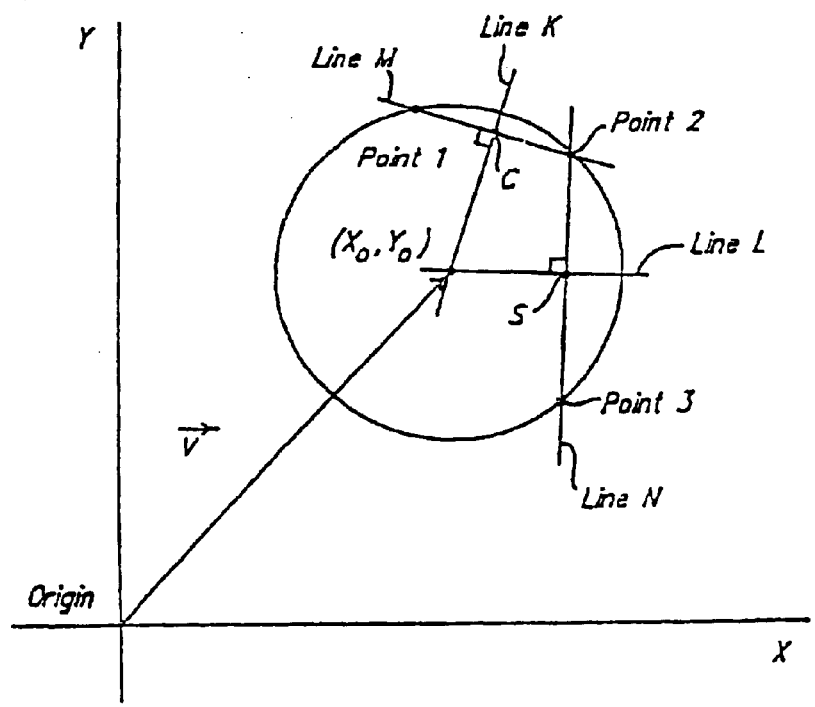
FIG. 5 is a graph illustrating the manner by which the compass system disclosed in U.S. Pat. No. 4,807,462 calculates the center of a circle.
Figure 11:
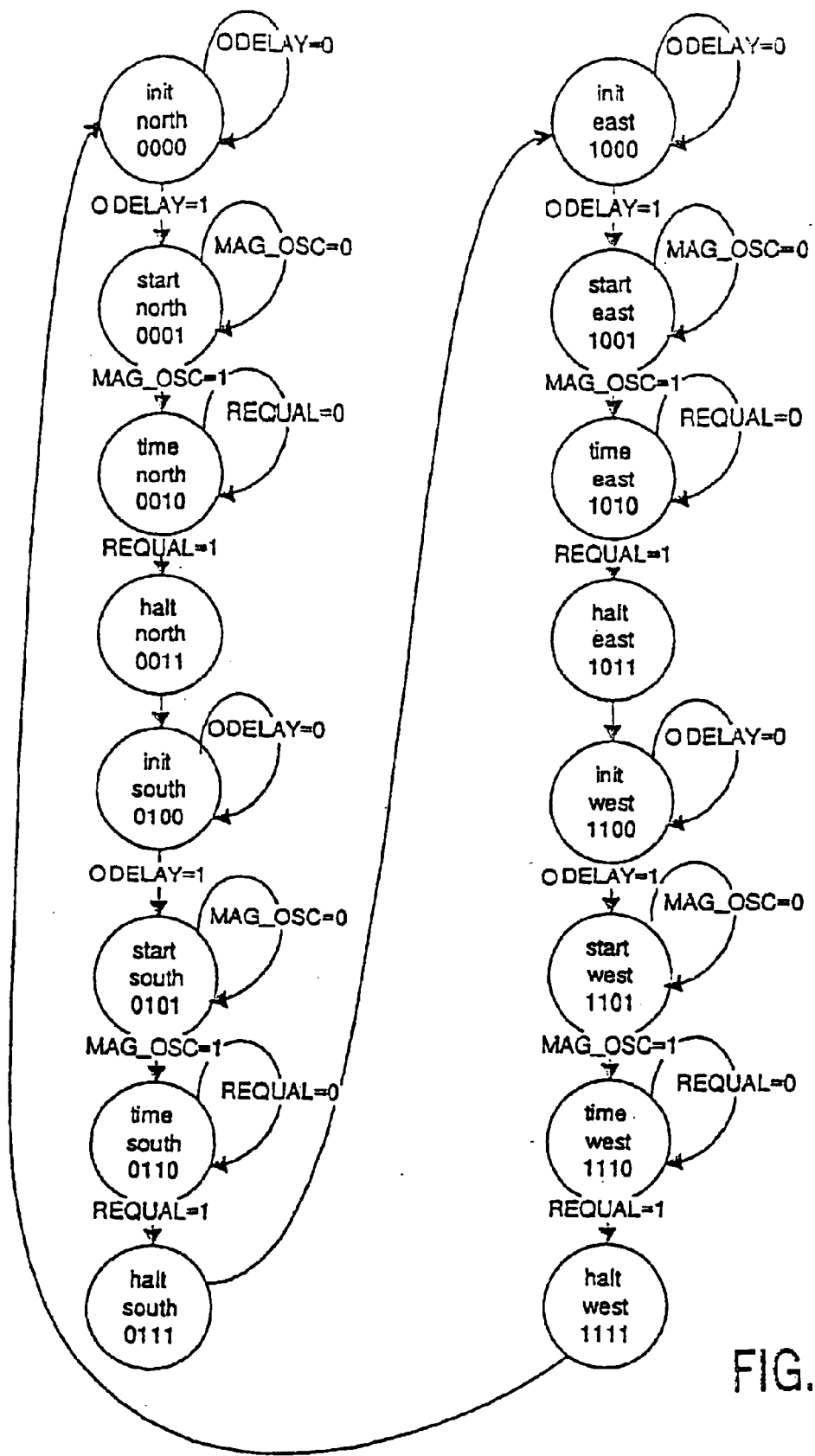
FIG. 11 is a state diagram illustrating the order in which the state machine constituting the compass control circuit changes between operating states.

In the third state designated as "0010" in FIG. 11, compass control circuit 58 outputs a signal (CLEAR=1) to the reset terminal of up/down counter 70 via line 90 and a signal (ENABLE=0) to the lock terminal of up/down counter 70 via line 88 in order to cause up/down counter 70 to begin counting the input clock pulses supplied via line 84a. In the first mode of operation (states 0001 and 0010), channel oscillator circuit 57a is biased in the positive polarity, with the frequency of the resulting electrical signal dependent on the magnitude and direction of the external magnetic field (as described above). As oscillator circuit 57 outputs an oscillating signal, the number of cycles of the electrical signal (divided by 8) is counted by ripple counter 68, while up/down counter 70 counts up so as to keep track of the elapsed time period. When equality comparator 64 determines that the number of cycles counted by ripple counter 68 is equal to the value stored in Channel 2 resolution register 62, it supplies an output signal (REQUAL=1) to compass control circuit 58 via line 82. This output signal causes circuit 53 to enter a fourth state designated as "0011" in FIG. 5. In this fourth state, compass control circuit 58 changes the output (CHL_N=0) supplied to oscillator 57 on line 96N to cause channel oscillator 57a to stop providing an output signal. Also, circuit 58 outputs a signal (ENABLE=1) on line 88 to lock counter 70 at the time period (counts value) counted to that point, outputs a signal (U/D=1) on line 86 to cause counter 70 to enter the "counting down" mode of operation, and outputs a signal (RCLEAR=1) on line 76 to clear ripple counter 68.

Next, compass control circuit 58 enters a fifth state designated as "0100" in FIG. 11 in which it outputs a signal (INDELAY=0) on line 79 causing delay circuit 77 to begin timing the predetermined initialization period. Circuit 58 also outputs a signal (CHL_S=1) on line 96S causing oscillator circuit 57 to enter its second mode of operation in which channel oscillator circuit 57a is negatively biased. Once the predetermined delay has expired, compass control circuit 58 enters similar states as previously described and outputs essentially the same control signals in the same sequence, except the up/down counter 70 counts down and channel oscillator 57a is negatively biased. As oscillator circuit 57 generates an oscillating signal, the number of cycles of the resulting electrical signal (divided by 8) is counted by ripple counter 68 while up/down counter 70, now in an unlocked state, counts down from the stored time period (count value) counted when channel oscillator 57a was positively biased. When equality comparator 64 determines that the number of cycles completed by the electrical signal generated by oscillator circuit 57 (divided by 8) is again equal to the value stored in Channel 2 resolution register 62, then an output signal (REQUAL=1) is again supplied to compass control circuit 58 via line 82. This output signal causes circuit 58 to change states again and lock counter 70 via line 88, with the count value then stored in counter 70 being the two's compliment time difference between the two measurement periods. This count value is the zero-compensated output, or data signal, described above and represents the actual field strength in the measurement direction of sensor 40. If the first measurement period is longer than the second measurement period such that counter 70 does not roll over, then the external magnetic field in the measurement direction of sensor 40 has a positive (north) polarity, and the count value is a positive number. If the second measurement period is longer than the first measurement period such that counter 70 rolls over, then the external magnetic field in the measurement direction of sensor 40 has a negative (south) polarity, and the count value is a negative number. If the two measurement periods are equal, then the count value and the magnitude of the external magnetic field in the measurement direction of sensor 40 are both zero. The zero-compensated count value, or data signal, stored in counter 70 at the end of the second measurement period is supplied to Channel 2 output register 74, which can be read by microprocessor 44 via line 47.

The output signal (REQUAL=1) supplied by equality comparator 64 via line 82, which causes compass control circuit 58 to change states and to lock counter 70 after the second measurement period, also causes circuit 58 to place counter 70 in the "counting up" mode of operation via line 86, to clear ripple counter 68 and (eventually) up/down counter 70 via lines 76 and 90, and to enable Channel 1 resolution register 60 via line 78 (while now maintaining Channel 2 resolution register 62 and Channel 2 output register 74 in a disabled state via lines 80 and 94). Compass control circuit 58 then causes oscillator circuit 57, via SELECT line 96E, to enter its third mode of operation in which channel oscillator 57b is enabled and positively biased. The process continues as described above until the fourth mode of operation of oscillator circuit 57 is completed (in which channel oscillator 57b is negatively biased) and a zero-compensated count value, or data signal, is supplied to Channel 1 output register 72 which can be read by microprocessor 44 via line 47. This count value is a positive number if the external magnetic field in the measurement direction of sensor 42 has a positive (east) polarity, is a negative number if the magnetic field has a negative (west) polarity, and is zero if the magnitude of the magnetic field is zero. The above process then repeats itself for the next measurement of the external magnetic field.

The zero-compensated count values, or raw data signals, generated by interface circuit 46 and provided to microprocessor 44, representing the sensed magnitude and direction of the magnetic field in the measurement direction of each of sensors 40 and 42, can be processed and plotted on an X-Y coordinate plane, as shown in FIG. 1. The magnetic field in the east/west measurement direction of sensor 42 is represented by the X axis, and the magnetic field in the north/south measurement direction of sensor 40 is represented by the Y axis. For a properly calibrated compass, the plot of compass count values creates a perfect circle around the origin of the coordinate plane when the vehicle travels in a 360° loop as indicated by graph A of FIG. 1. The radius of the circle represents the earth's magnetic field strength, and the vehicle's compass heading at a particular time during travel is represented by a point on the circle, which is identified by the sensed orthogonal components lying on the X and Y axes. By calculating the angle which the point forms with the X-Y coordinate plane, the compass heading of the vehicle may be determined.

It should be noted that the plot of zero-compensated count values, or raw data signals, will be affected if there is a change in vehicular magnetism. Such a change will cause the magnetic field sensed by the compass channels when the vehicle is heading in a given direction to be either greater than or less than that expected for a vehicle with no magnetic interference. As a result, the plot of count values will be shifted away from the origin of the coordinate plane in some direction, resulting in a circle such as graph B of FIG. 1 when the vehicle travels a 360° loop. As is described below, microprocessor 44 corrects for any vehicular magnetism by manipulating the parameters of the measurement range system so that the origin of He coordinate plane coincides with the center of the plotted circle. It should also be noted that the plot of zero-compensated count values may be elliptical in nature instead of a perfect circle as shown as graph H in FIG. 13. The reason for such an elliptical effect is that the construction of the vehicle generally results in more vehicle mass along one axis of compass sensing which causes the earth's field to penetrate the vehicle differently in different directions. This causes the compass channels to not react uniformly to the earth's field as the vehicle travels in a 360° path of travel. As is described below, an elliptical plot of zero-compensated count values may be corrected to provide a circular plot, wherefrom a heading angle of the vehicle may be calculated, by adjusting the resolution of the compass system.

As mentioned above, oscillator circuit 57 generates a signal that oscillates for a predetermined number of cycles for the measurement period of each bias polarity of each of channel oscillators 57a and 57b. The values stored in Channel 1 and Channel 2 resolution registers 60 and 62 determine the number of cycles to be completed; Because of the inclusion of division circuit 60, the number of cycles completed by the output signal of circuit 57 for each bias polarity of the channel oscillators is equal to the value stored in the resolution register (corresponding to that sensor) multiplied by 8. Interface circuit 46 calculates a zero-compensated count value for each of sensors 40 and 42, with each count of these zero-compensated count values representing a particular amount of magnetism. The milligauss to count ratio of a zero-compensated count value is determined by the number of cycles completed by the output signal from oscillator circuit 57 for both bias polarities of the channel oscillators generating that count value, with the exact relationship (dependent on the construction of the sensor and the clock frequency of counter 70) capable of being ascertained by experimental means. Thus, by enabling microprocessor 44 to change the values stored in registers 60 and 62 by means of adjustment signals via line 45, the milligauss to count ratio of the zero-compensated count values can be increased or decreased.

By adjusting the milligauss to count ratio, the circular plot of count values and the resolution of the compass system can be chanced. For example, let us assume that the measurement period for each bias polarity of the channel oscillators consists of 100 cycles of the signal output from division circuit 66 (corresponding to a value of 100 stored in resolution register 60 or 62 which equates to 800 cycles of oscillator circuit 57) and that this corresponds to a zero-compensated count value, or data signal, having a milligauss to count ratio of 4:1. In this situation, a change in the actual field strength of 4 milligauss will change the zero-compensated count value by one count. If the number of cycles of the signal output from division circuit 66 is doubled to 200 cycles for the measurement period for each bias polarity of the channel oscillator of the same sensor (by storing the value of 200 in the appropriate resolution register), then counter 70 will count twice as many counts for each bias polarity of the channel oscillators. As such, the difference between the count values for the two bias polarities, the zero-compensated count value, will be twice as large for the same magnitude of magnetism. This will cause the milligauss to count ratio of the zero-compensated count value to be halved, such that each count will correspond to 2 milligauss of magnetism instead of 4. As such, the number of zero-compensated count values into which the electrical signals from oscillator circuit 57 can be resolved is increased, and the span of the plot of count values in the measurement direction of the particular sensor is twice as large. Similarly, if the number of cycles of the signal output from division circuit 66 is halved from the original 100 cycles to 50 cycles for the measurement period for each bias polarity of the channel oscillators (by storing the value of 50 in the appropriate resolution register), then counter 70 will count half as many counts for each bias polarity of the channel oscillators, and the zero-compensated count value will be half as large for the same magnitude of magnetism. This will cause the milligauss to count ratio of the zero-compensated count value to be doubled, such that each count will correspond to 8 milligauss of magnetism instead of 4. As such, the number of zero-compensated count values into which the electrical signals from oscillator circuit 57 can be resolved is decreased, and the span of the plot of count values in the measurement direction of the particular sensor is half as large.

If the number of cycles to be completed by the signal generated by oscillator circuit 57 for the measurement period for each bias polarity of the channel oscillators is changed by changing the values stored in both of resolution registers 60 and 62 by means of adjustment signals from microprocessor 44 via line 45, then the size of the entire circular plot of count values will be adjusted. Specifically, if the number of cycles for the measurement period of each sensor is increased, then the resolution of the compass system and the size of the circular plot will be increased from plot I to plot G in FIG. 13, for example. If the number of cycles for the measurement period of each sensor is decreased, then the resolution of the compass system and the size of the circular plot will be decreased from plot J to plot G in FIG. 13, for example. In the preferred embodiment, the programming for microprocessor 44 attempts to maintain the span of count values in the measurement direction of each sensor (and thus the size of the circular plot) at a constant value (stored in memory) by manipulating the values stored in resolution resisters 60 and 62 by means of adjustment signals via line 45 to account for changes in the magnitude of the sensed magnetic field of the earth. (Alternatively, the spans of count values may be kept between two stored threshold values.) As described above, the earth's magnetic field, comprised of both horizontal and vertical components, is mostly horizontal near the equator and progressively becomes more vertical as one travels into the northern or southern latitudes. Because sensors 40 and 42 are oriented to sense the horizontal components of the earth's magnetic field, the magnitude of the sensed magnetic field is greatest near the equator and progressively tapers off as a vehicle travels into the northern or southern latitudes. As such, the adjustment signals of microprocessor 44 increase the number of cycles for the measurement period of each sensor, thus enlarging the circle when the vehicle travels away from the equator, and decrease the number of cycles for measurement period of each sensor, thus reducing the circle when the vehicle travels towards the equator. As described above, it is very beneficial to enlarge the circular plot when the vehicle travels into the far northern or southern latitudes of the earth. This causes the circular plot to be comprised of more count values which can be resolved into more angles from which the heading of the vehicle is calculated. This enables more accurate heading information to be provided in such environments.

Figure 13:
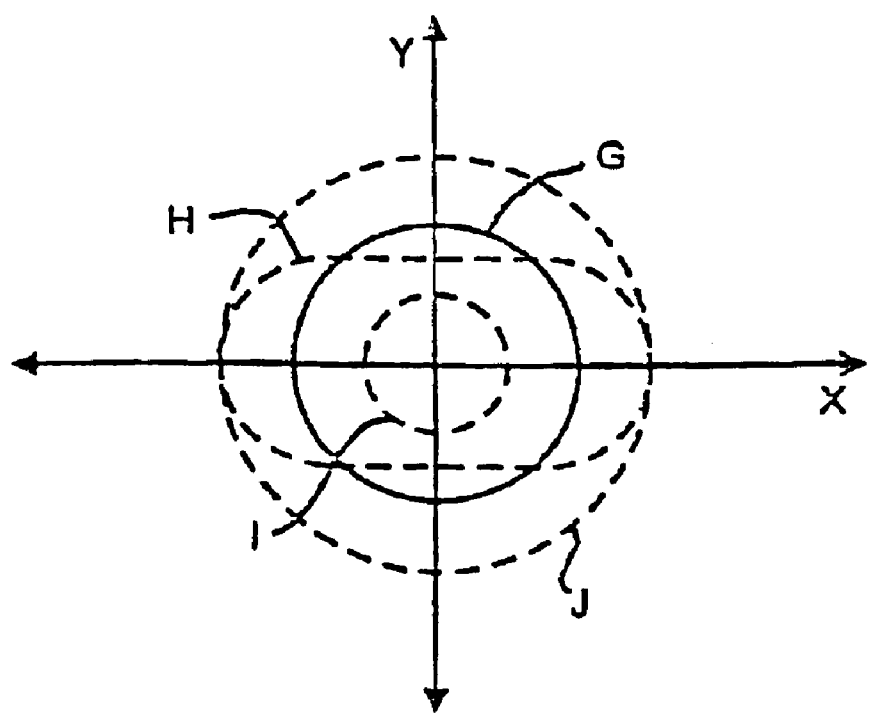
FIG. 13 is a graph illustrating the preferred measurement range system of the present invention, the ideal signal representing the sensed magnitude and direction of the earth's magnetic field, and the signal after a change in vehicular magnetism.

In addition to compensating for changes in the magnitude of the sensed magnetic field of the earth, the above process is useful when the plot of count values is initially elliptical in nature instead of the perfect circle of graph G of FIG. 13. By adjusting the span of count values in the measurement direction of each sensor so as to move them closer to the same stored value (or closer to being between two stored threshold values), the elliptical plot (graph H) is transformed into a circular plot (graph G) wherefrom a heading angle of the vehicle may be calculated. Such a correction is usually needed only once when the compass system is first energized.

It is important to note that changing the values stored in resolution registers 60 and 62 by means of adjustment signals via line 45 accomplishes much more than just a multiplication of the zero-compensated count values by a particular factor. Such a multiplication, although changing the size of the plotted circle, would not increase or decrease the number of zero-compensated count values into which the electrical signals from oscillator circuit 57 are capable of being resolved. Instead, the number of count values making up the plot of the new circle would be the same as the original circle and would be capable of being resolved into the same number of angles from which the heading of the vehicle is calculated. By not enabling the resolution of the compass system to be increased, multiplication of the count values would not enable more accurate heading information to be provided when the magnitude of the sensed magnetic field of the earth is very small.

The dynamic operating range of the measurement system of the present invention, by means of working with 16-bit information, is large enough such that calibration is achieved purely by software corrections in which variables are adjusted according to offset values stored in memory. Thus, the compass fully utilizes the dynamic range made available through the use of the magneto-inductive sensors. A detailed description of the programming for microprocessor 44 to filter and process the raw data from interface circuit 46 and to calibrate the system and generate heading information from the filtered and processed data, is provided below with reference to FIGS. 14–22.

Filtering and Calibration Processing

As noted above, the zero-compensated channel data provided to microprocessor 44 from interface circuit 46 on line 47 is raw data that has suspect accuracy due to the possibility that the magnetic field as sensed by the sensors may have been obtained in a magnetically noisy environment. In the exemplary embodiment discussed above, this raw data is translated by microprocessor 44 from the electrical signals received from both sensors 40 and 42 approximately 8 times per second. As explained above, the raw channel data output from interface circuit 46 will have a 16-bit count value obtained from each of sensors 40 and 42. As explained below, microprocessor 44 treats the 16-bit raw channel data obtained from north/south sensor 40 as the value of the Y coordinate of a raw data point taken along a Y axis, and treats the 16-bit channel data obtained from the east/west sensor 42 as the X coordinate value with respect to the X axis for that raw data point. As also described below, these X and Y coordinate values are read every ⅛ second and are processed for use in determining the vehicle's current heading and recalibrating the compass system in accordance with the exemplary process outlined in the flow charts shown in FIGS. 14A–14E, 15, and 16A–16C.

FIGS. 14A–14E illustrate a main loop of the compass control program 200 executed by microprocessor 44. The main loop of compass control routine 200 commences in step 201 in which microprocessor 44 determines whether it is an initial calibration mode. If so, microprocessor 44 executes step 202 by initializing parameters and clearing various counters and flags that are described in more detail below. Additionally, a default value of 25 counts is stored in the variable R, which corresponds to the radius of the circular plot of data. The value of variable R is initially stored in the variable MINDIST, which is also described in more detail below. Next, microprocessor 44 receives the first raw data point consisting of the X and Y values of the channel data received from interface circuit 46 (step 203). Before accepting this first data point, microprocessor 44 determines whether the vehicle is moving in step 204 by reading the vehicle's speed from speed sensor 41. If microprocessor 44 determines that the vehicle is moving, it accepts and stores the X and Y values of the received raw data point in the variables RAWX and RAWY, respectively (step 205). If the vehicle is not moving, microprocessor 44 continues to receive, but not store, the data points from interface circuit 46 until it detects that the vehicle is moving.

For reasons discussed in detail below, the X and Y values stored in the variables RAWX and RAWY are also respectively stored in the variables CENX and CENY and in the respective variables TWITX and TWITY. Subsequently, microprocessor 44 sets the value of a status indicator TSAT=1 to indicate that an initial raw data point has been obtained and that the compass system has entered a state whereby it will look for a first candidate data point to utilize in calibrating the compass (step 210). Next, microprocessor 44 receives the next raw data point from interface circuit 46 (step 212), and checks the vehicle's speed as supplied from speed sensor 41 (step 214). If the vehicle is moving, microprocessor 44 increments a counter A (step 216), which is used to count the number of consecutive data points that are not excluded by the twit filtering that is performed by TWIT subroutine 218. The details of the operations performed in the TWIT subroutine are described below with reference to FIG. 15.

If in step 201 microprocessor 44 determines that it is not in an initial calibration mode, it reads calibration numbers previously stored in memory in step 207 and collects and stores a raw data point in the variables TWITX and TWITY in step 208 prior to proceeding to step 210 where the program performs the operations described above.

The twit filtering performed in TWIT subroutine 218 is provided to filter out those data points that appear to have X and Y values that are influenced by the presence of magnetic noise. As will be apparent from the description below, microprocessor 44 performs this twit filtering by comparing the most recently obtained channel data to the most recently obtained non-filtered raw data point and it filters out those data points that are beyond a threshold distance from the last raw data point that had not been discarded. To perform this function, microprocessor 44 begins the TWIT subroutine by subtracting the value stored in the variable TWITX from the X value of the raw channel data collected in step 212 (FIG. 14A), and compares this value to the values stored in the variable TWITVAL (step 220). As noted above, the value stored in the variable TWITX is the same value currently stored in the variable RAWX (see step 208). The value stored in the variable TWITVAL is initially set equal to 6 counts (step 202) and is subsequently set to 14 (step 304, FIG. 16B). Thus, if the value of the X channel data obtained in step 212 is no more than 6 plus the value stored in the variable TWITX, microprocessor 44 will consider the value of the X channel data to be acceptable and will proceed to step 228 to test the value of the Y channel data. On the other hand, if the value of the X channel data is more than 6 counts away from the X value of the most recent unfiltered raw data point that had not been discarded, microprocessor 44 will filter out the data point collected in step 212 and increment the TWITXCNT counter, which counts the number of consecutive X channel twits. Microprocessor 44 also increments the TWITCNT counter, which counts the total number of twits (filtered out raw data points) that occur between the collection of averaged data points (step 222). Additionally in step 222, microprocessor 441 sets a TWIT flag to indicate that a twit has been detected and sets the value of counter A to zero in order to begin recounting the number of raw data points that pass the twit filter test.

In step 224, microprocessor 44 checks whether the value of TWITXCNT has reached 16. If the TWITXCNT counter has reached 16, microprocessor 44 will assume that the most recent raw data point that was not filtered out is unreliable, and will then store the value of the most recent X channel data in the variable TWITX while clearing the TWITXCNT counter (step 226). By including steps 224 and 226, microprocessor 44 is prevented from continuously filtering out data points that may otherwise be accurate but are being excluded due to an inaccurate previously obtained reference raw data point.

Figure 14A:
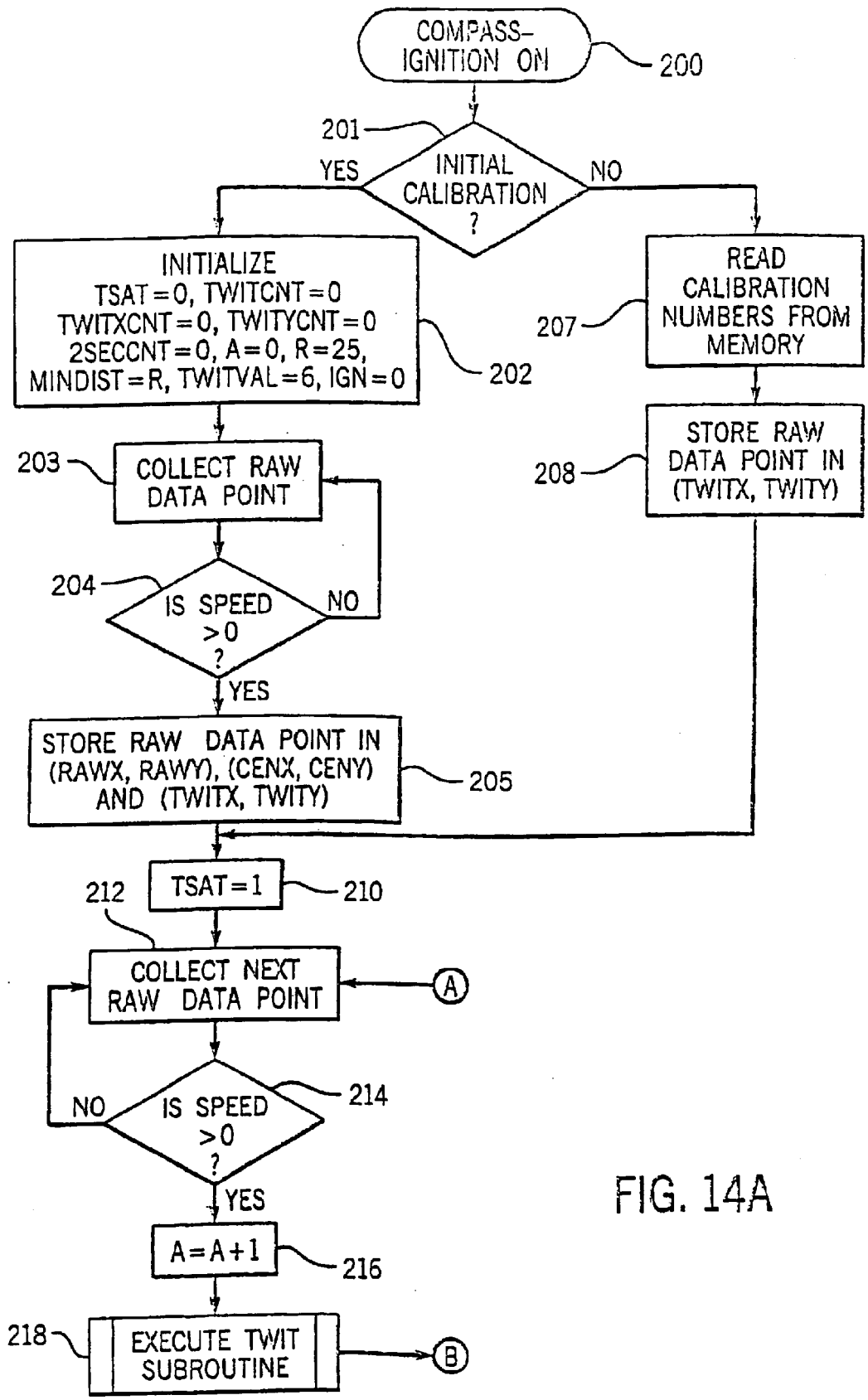
FIGS. 14A–14E are flow charts illustrating the flow of operations of a main control loop for the compass control routine as executed by microprocessor 44 shown in FIG. 8.
Figure 14B:
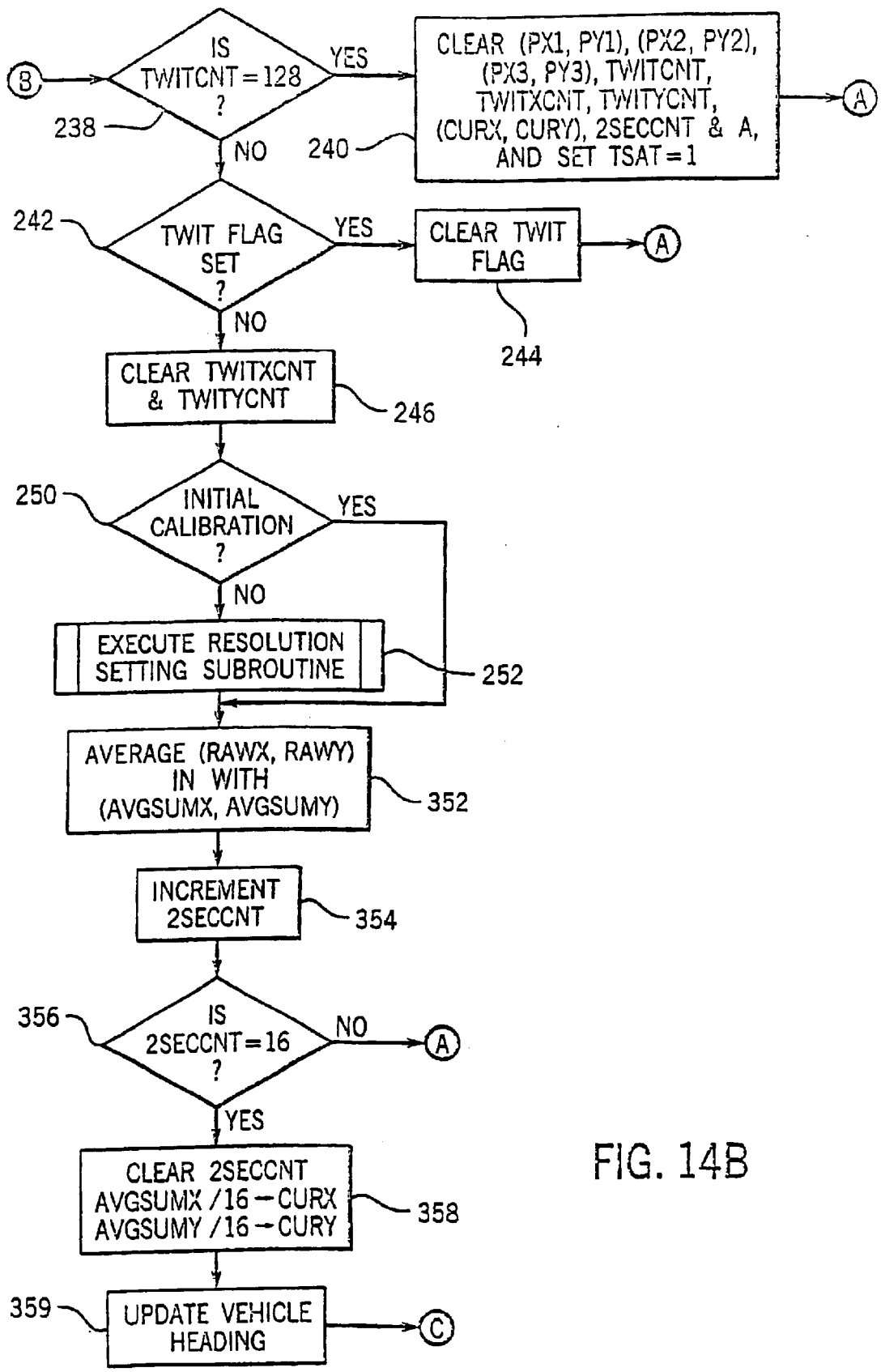
Figure 14C:
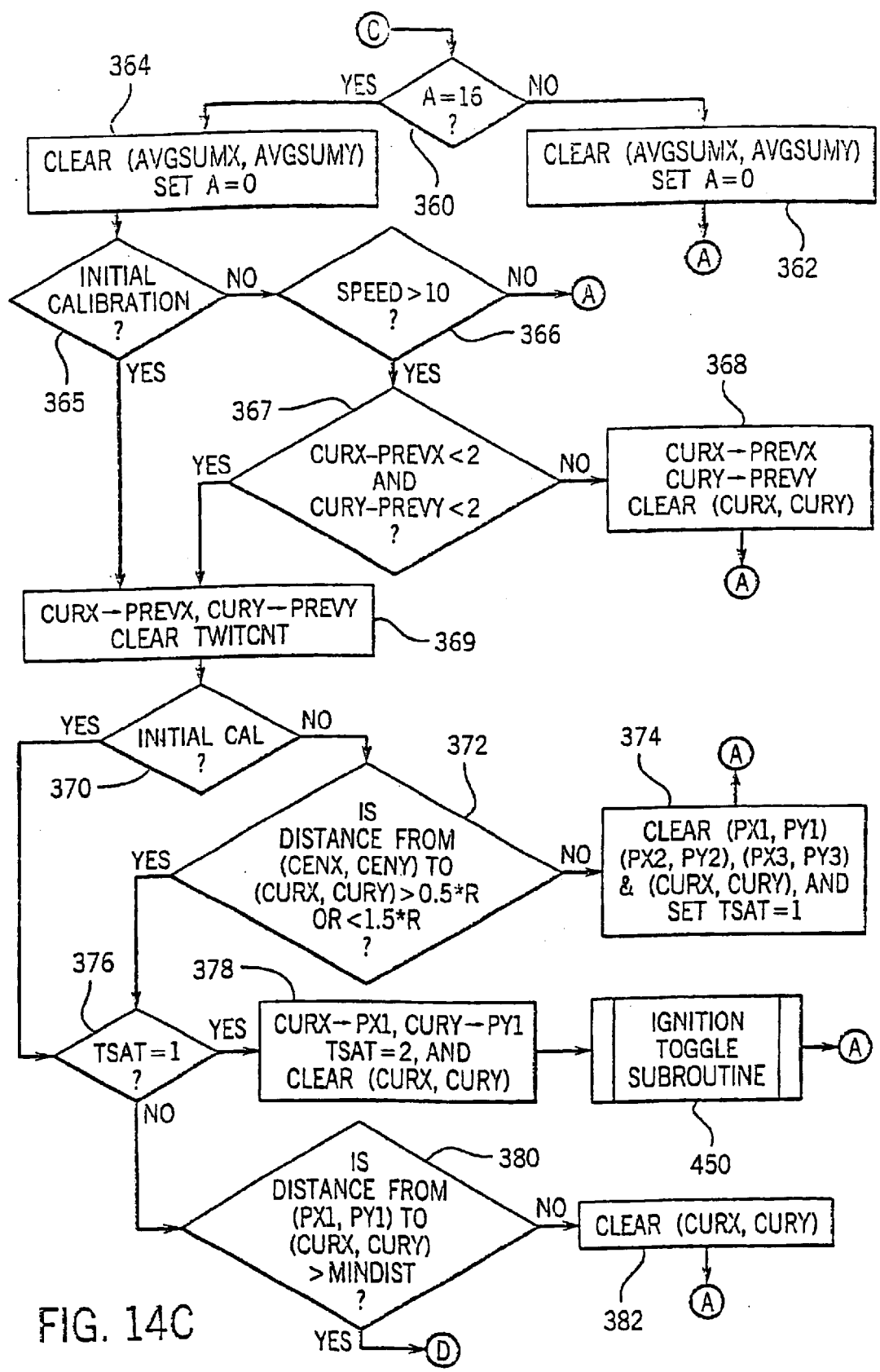

In steps 228–234, microprocessor 44 performs tasks with respect to the most recently collected Y channel data that are the same as those performed in steps 220–226 with respect to the X channel data. Then, as indicated in step 236, the subroutine returns control back to the main control loop at step 218 (FIG. 14A). As shown in FIG. 14B, the next step (238) performed by microprocessor 44 is to check whether the TWITCNT counter has reached 128. If it has reached 128, microprocessor 44 clears the values from the following variables: PX1, PY1, PX2, PY2, PX3, PY3, TWITCNT, TWITXCNT, TWITXCNT, CURX, CURY, 2SECCNT, and A in step 240. Additionally, if TSAT is equal to a value other than 1, TSAT is set equal to 1. Subsequently, microprocessor 44 returns to step 212 (FIG. 14A) to collect the next raw data point. The effect of clearing PX1, PY1, PX2, PY2, PX3, and PY3 in step 240 is to clear out any filtered averaged data points that were previously stored as candidates for use as one of the three data points for calibrating the compass. As discussed below with reference to step 369 (FIG. 14C), the TWITCNT counter is cleared when a filtered averaged data point is obtained. Therefore, if the magnetic environment in which the compass system is being operated is so noisy that the compass system has to filter out 128 data points prior to obtaining an averaged data point, the magnetic environment is presumed to be too noisy to have obtained any prior averaged data points that are sufficiently reliable to be used in calibrating the compass.

If, in step 238, microprocessor 44 determines that the TWITCNT counter has not yet reached 128, microprocessor 44 checks whether the TWIT flag had been set in steps 222 or 230 (step 242). If a twit had been detected in TWIT subroutine 218 and the TWIT flag had been set, microprocessor 44 clears the TWIT flag in step 244, while discarding the X and Y channel data most recently obtained, and returns to step 212 (FIG. 14A) to collect the next raw data point.

If microprocessor 44 determines that the TWIT flag had not been set (step 242), it assumes that the most recently collected raw channel data had not been filtered out by the TWIT subroutine. In this event, microprocessor 44 clears the TWITXCNT and TWITYCNT counters (step 246). Next, microprocessor 44 determines whether it is in an initial calibration mode (step 250). If it is in an initial calibration mode, microprocessor 44 calls and executes a resolution setting subroutine 252 in order to determine whether the resolution of the compass needs to be adjusted. If the microprocessor 44 is in an initial calibration mode, it skips the resolution setting routine 252 and proceeds to step 352, which is described below.

Figure 16A:
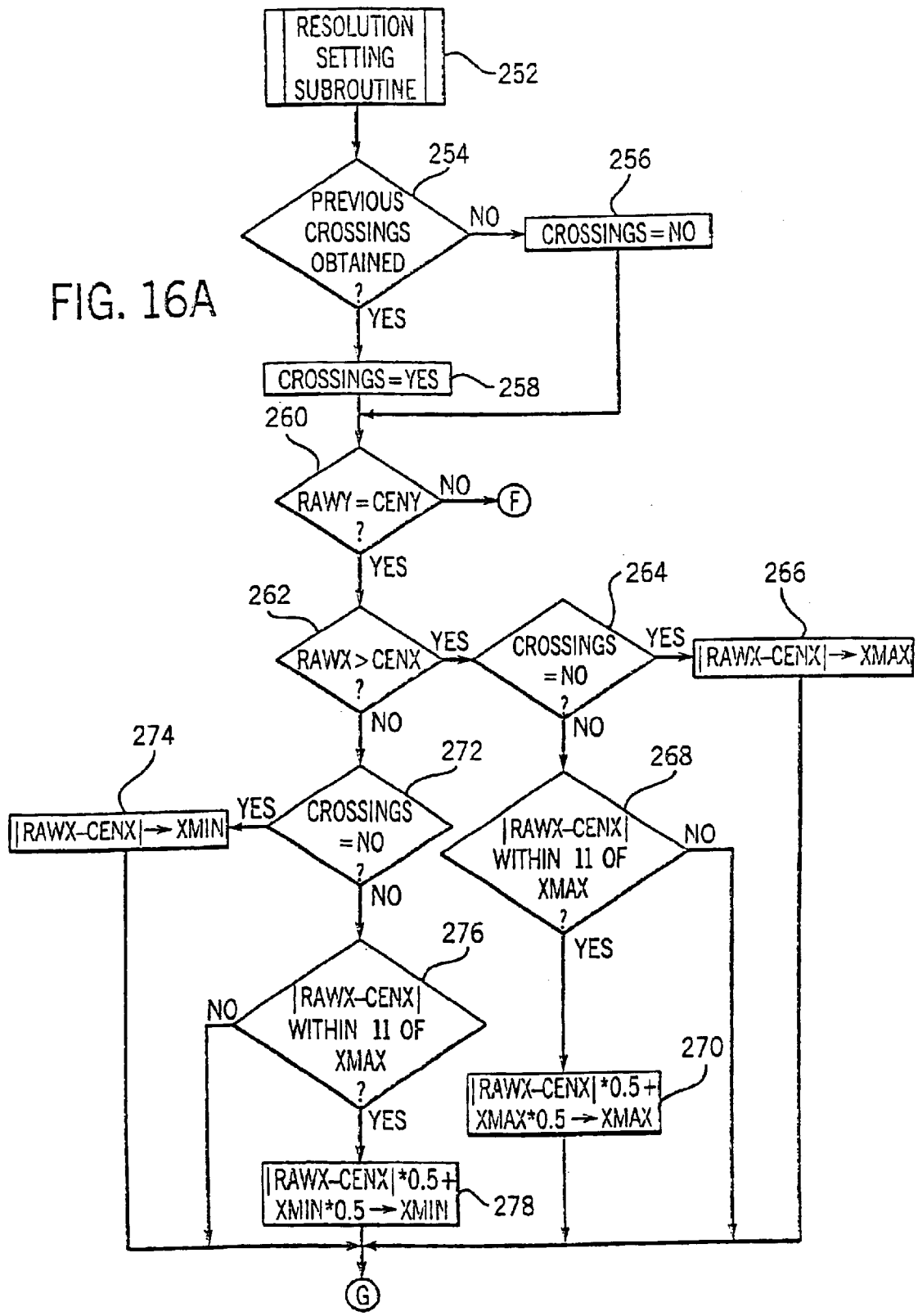
FIGS. 16A–16C are flow diagrams representing the flow of operations performed during a resolution setting subroutine executed as part of the main control loop of the compass control routine illustrated in FIGS. 14A–14E.
Figure 16B:
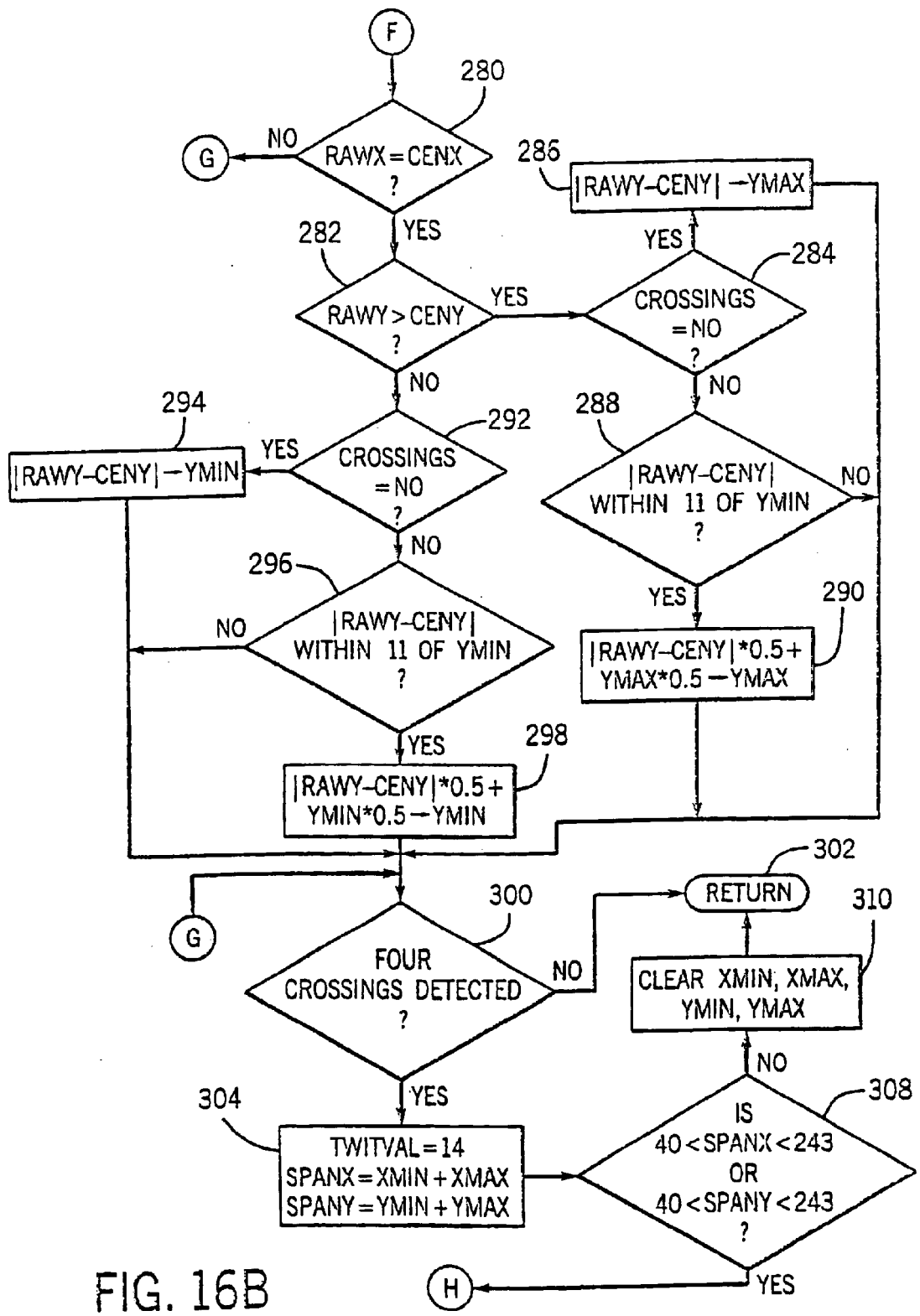
Figure 16C:
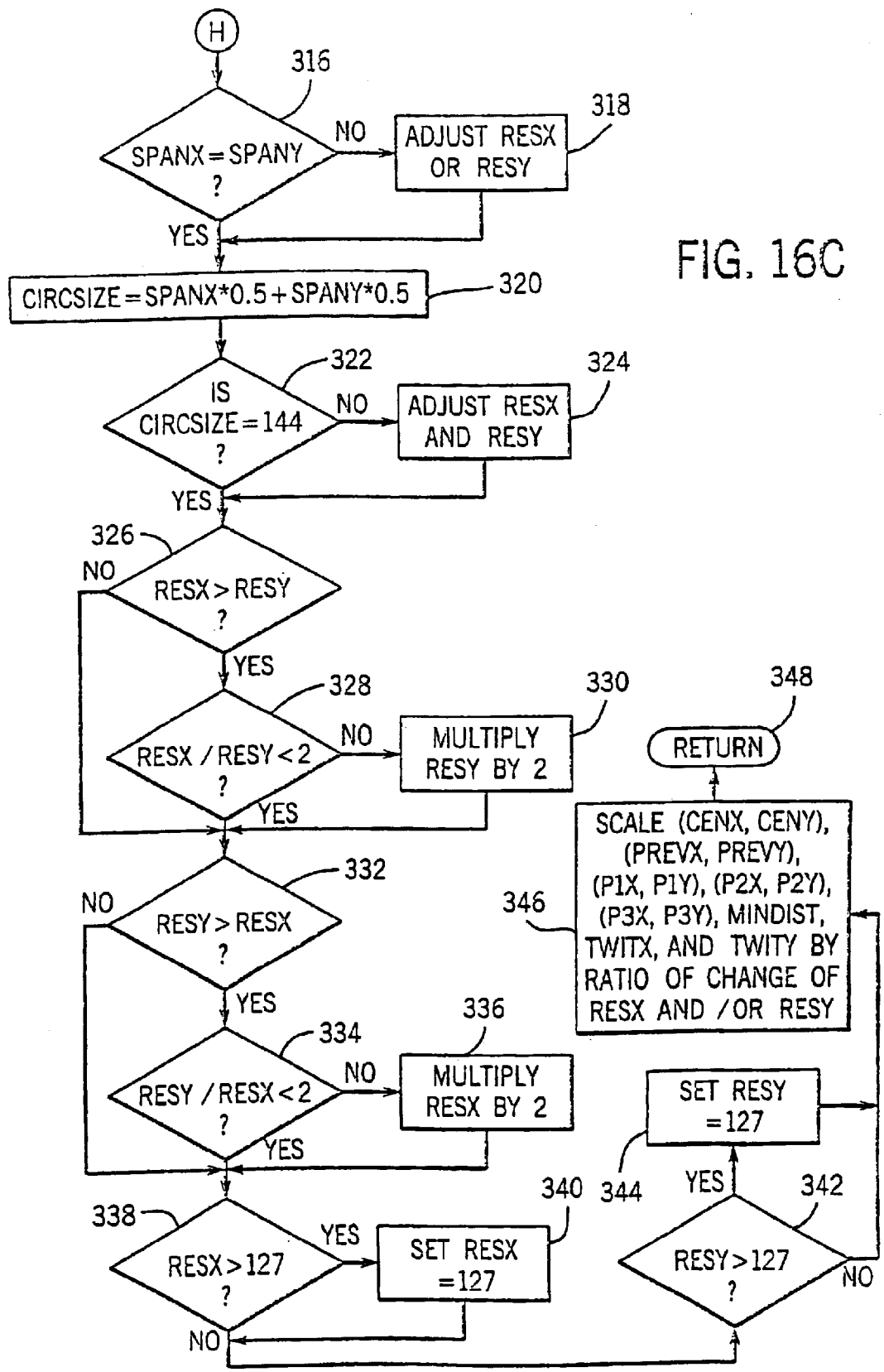

FIGS. 16A–16C illustrate the steps performed by such a resolution setting subroutine 252. In general, resolution setting subroutine 252 checks whether the raw data point stored as (RAWX, RAWY) represents a maximum or minimum value with respect to the X or Y axis. To determine whether the data point is a maximum or minimum value, the most recently computed center point for the circle is used as a reference point (see FIG. 18). Using the most recent center point as a reference, the microprocessor looks at the X and Y values of the raw data point to determine whether the data point represents a "crossing." The term "crossing" is used because, if the center of the circle coincided with the origin of the X-Y coordinate axis, a data point on one of these axes would constitute the maximum or minimum value for X or Y. The manner by which these crossings are identified and stored is described below with respect to steps 254–298 (FIGS. 16A and 16B).

As will also be explained below with reference to the remaining portion of the resolution setting subroutine, the obtained values for the crossings are used to determine whether the circle is, in fact, an ellipse or whether the diameter of the circle in both directions has changed such that adjustment to the values stored in the resolution registers should be adjusted.

The resolution setting subroutine 252 begins with step 254 whereby microprocessor 44 first determines whether any previous crossings have been obtained. If no crossings had been obtained previously, microprocessor 44 sets a CROSSINGS flag equal to NO. Otherwise, microprocessor 44 sets a. CROSSINGS flag equal to YES in step 258. Microprocessor 44 determines whether the data point is at an X axis crossing in step 260 by checking whether the value of RAWY is equal to the value of CENY, which is the Y value for the computed center of the circle. If RAWY, is not equal to CENY, microprocessor 44 proceeds to step 280 (FIG. 16B). If RAWY is equal to CENY, microprocessor 44 then determines whether the value of RAW-X is greater than CENX (step 262). This step is performed to determine whether the X axis crossing represents the maximum X value or the minimum X value. If RAWX is greater than CENX, microprocessor 44 then determines whether the CROSSINGS flag is equal to NO in step 264. If the CROSSINGS flag has been set to NO, microprocessor 44 recognizes that previous crossings have not been obtained and therefore stores the absolute value of the difference in the values of RAWX and CENX in the variable XMAX (step 266). If, in step 264, microprocessor 44 determines that CROSSINGS is equal to YES, it Snows that previous crossings have been obtained and then determines in step 268 whether the difference between the absolute value of the values of RAWX and CENX is within 11 counts of the previously stored value for XMAX (step 263). If the difference of RAWX and CENX is not within 11 counts of the previously stored value of XMAX, microprocessor 44 does not change the value stored in XMAX. If, on the other hand, the difference between the value stored in RAWX and CENX is within 11 counts of XMAX, microprocessor 44 averages the difference between RAWX and CENX equally with the previously stored value for XMAX and stores this result as the current value of XMAX (step 270). By averaging this difference into the previous value of XMAX, the compass system will not overreact to any one raw data point that appears to be a crossing.

If, in step 262, microprocessor 44 determines that RAWX is not greater than CENX, it then executes steps 272–278, which correspond to steps 264–270 except that the crossing value that is obtained is that of XMIN rather than XMAX. After performing these steps, microprocessor 44 advances to step 300 (FIG. 16B).

In step 280 (FIG. 16B), microprocessor 44 determines whether the raw data point is a Y axis crossing. If not, microprocessor 44 advances to step 300. Otherwise, microprocessor 44 performs steps 282–293, which correspond to steps 262–278 described above except that the crossing values to be obtained are either YMAX or YMIN.

Figure 18:
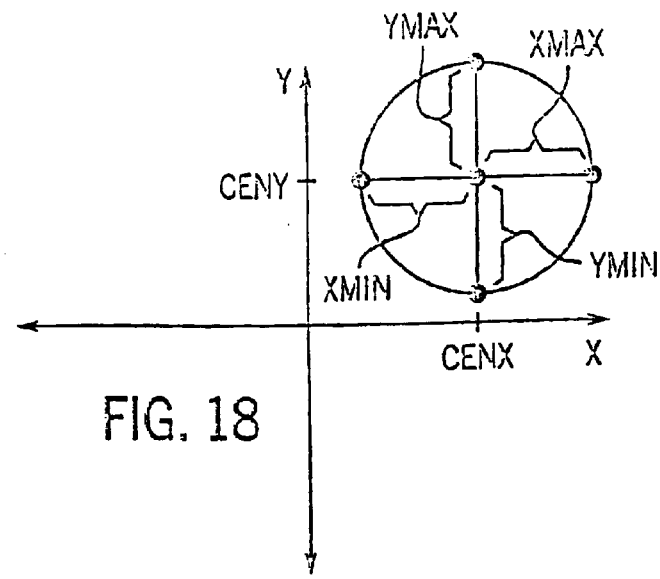
FIG. 18 is a graph illustrating the manner by which the compass system identifies crossing points and calculates the circle spans in the X and Y directions.
Figure 19:
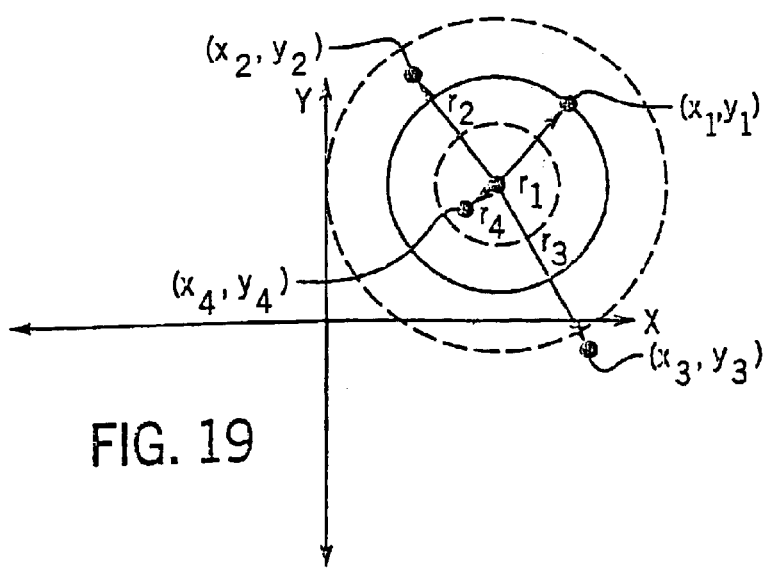
FIG. 19 is a graph illustrating a radius-checking filter technique employed by the process of the present invention.

In step 300, microprocessor 44 determines whether any crossings were detected in the previous steps of the resolution setting subroutine. If no new crossings were detected, the process returns to step 352 (FIG. 14B). If any new crossings are detected, microprocessor 44 calculates new values for the spans SPANX and SPANY using the most recently obtained values for XMIN, XMAX, YMIN, and YMAX (step 304). As illustrated in FIG. 18, the sum of XMIN and XMAX is equal to the diameter of the circle in the X direction, while the sum of YMIN and YMAX is the diameter of the circle in the Y direction. Also, in step 304, the value of TWITVAL is set to be equal to 14 counts so as to increase the range of acceptable raw data points that can pass through the twit filtering. In step 308, microprocessor 44 determines whether either of spans SPANX or SPANY falls between 40 and 243 counts. If either SPANX or SPANY does not fall within the 40 to 243 count range, all stored crossing values XMIN, XMAX, YMIN, and YMAX are cleared so that new crossing values may be obtained (step 310). Once the values are cleared in step 310 or if spans SPANX and SPANY both fall within the range, microprocessor 44 advances to step 316 (FIG. 16C).

The Step 316, microprocessor 44 determines whether the span (SPANX) of the circle in the X direction is equal to the span (SPANY) in the Y direction. If these spans are equal, the microprocessor determines that the crossings represent a circle rather than an ellipse and thus advances to step 320. If, on the other hand, SPANX is not equal to SPANY, microprocessor 44 adjusts the resolution number that is stored in the resolution register for either the X or Y axis sensor (step 318). If the span in the X direction is smaller than the span in the Y direction, the value of RESX that is stored in the resolution register for the X axis sensor is increased. If the span in the Y direction is smaller than that in the X direction, the value of RESY as stored in the Y axis resolution register is increased. In this manner, the compass system may compensate for vehicular magnetism that affects the sensed field differently amongst the X and Y axis sensors.

In step 320, microprocessor 44 computes the circle size (CIRCSIZE) by averaging together the spans SPANX and SPANY. Then, in step 322, microprocessor 44 determines whether the circle size is equal to 144 as measured in counts. If the circle size is equal to 144, microprocessor 44 advances to step 326. However, if the circle size is not equal to 144, the microprocessor first adjusts both the RESX and RESY resolution values stored in the two resolution registers (step 324) prior to proceeding to step 326. More specifically, if the circle size is less than 144, RESX and RESY are increased proportionately so as to eventually obtain and maintain a circle size of a predetermined value, such as 144.

In step 326, the microprocessor determines whether the resolution in the X direction, RESX, is greater than the resolution in the Y direction, RESY. If not, the, program advances to step 332. Otherwise, the program first determines whether RESX divided by RESY is equal to or less than 2 (step 328). If RESX divided by RELY is greater than 2, the microprocessor multiplies the value RESY, by 2 in step 330 prior to advancing to step 332. Step 332 checks whether RESY is greater than RESY. If not, microprocessor 44 executes step 338. Otherwise, it determines whether RESY divided by RESX is less than or equal to 2 (step 334). If it is, microprocessor 44 advances to step 338, otherwise it multiplies the value of RESX by 2 (step 336) prior to proceeding to step 338.

In steps 338–344, microprocessor 44 determines whether the value in RESX or RESY is greater than 127. If so, it sets the value of RESX and/or RESY to 127 to prevent these resolution settings from reaching too high of a value. Next, microprocessor 44 executes step 346 in which it scales various parameters if the value of the resolution registers RESX and/or RESY have been changed. The need for such scaling is based upon the fact that the values stored for these variables represents a number of counts generated by interface circuit 46. When the resolution is changed, the milligauss per least-significant bit (LSB) of the count value is changed. Therefore, each previous representation of a data point in terms of counts would represent a different value in milligauss and would not correlate with any new counts obtained from interface circuit 46 if these values were not scaled. After the values of MINDIST, CENX, CENY, PREVX, PREVY, PX1, PY1, PX2, PY2, PX3, PY3, TWITX, and TWITY have been scaled in step 346, microprocessor 44 returns to step 352 as indicated by the return 348.

Referring back to FIG. 14B, microprocessor 44 averages the values stored in RAWX and RAWY into the values stored for the currently maintained average AVGSUMX and AVGSUMY (step 352). Next, microprocessor 44 increments the 2SECCNT counter in step 354 so as to count the number of raw data points that have been averaged into the current average. In step 356, the microprocessor checks whether the value of the 2SECCNT counter has reached 16. If not, the process returns to step 212 in FIG. 14A to collect the next raw data Paint. Once microprocessor 44 determines that the 2SECCNT counter has reached a count of 16, it clears the 2SECCNT counter in step 358 and determines at that point that it has obtained an averaged data point consisting of 16 filtered raw data points. Also in step 358, microprocessor 44 divides the cumulated averaged data points AVGSUMX and AVGSUMY by 16 and stores these values as CURX and CURY, respectively. Then, in step 359, microprocessor 44 updates the vehicle heading using the current data point values CURLX and CURY.

In ideal conditions, whereby 16 consecutive raw data signals are obtained that pass through the TWIT filter, the averaged data will be the average of received raw data over a two-second average given that 8 raw data points are obtained per second. It is nevertheless possible, however, that more than two seconds may elapse before an averaged data point is obtained, since some of the raw data points may be filtered out by the twit filtering routine discussed above.

To add a higher level of confidence in the averaged data point that is obtained using the above steps in the microprocessor program, microprocessor 44 subjects the averaged data points thus obtained to additional filtering steps. The first level of filtering requires that all 16 raw data points used to compute the averaged data point that is stored in (CURX, CURY) are consecutive raw data points that were obtained without detection of a twit. As noted earlier, the A counter is incremented in step 216 (FIG. 14A) each time a raw data point is collected, and is reset to 0 in steps 222 and 230 (FIG. 15) each time a raw data point that is collected is filtered out by the twit filtering subroutine. Thus, by checking whether A has reached a count of 16 in step 300, microprocessor 44 can determine whether the averaged data point was obtained using 16 consecutive raw data points. If counter A reaches a count higher than 16, microprocessor 44 clears the values representing the averaged data point in (AVGSUMX, AVGSUMY) and resets counter A back to 0 (step 362) prior to returning to step 212 to collect the next data point, in which case the current averaged datapoint (CURX, CURY) is not used for subsequent calibration. If the A counter is equal to 16, microprocessor 44 resets A to 0 and clears the values representing the averaged data point in (AVGSUMX, AVGSUMY) in step 364 prior to proceeding to the next filtering process prescribed by steps 365–369.

In the next filtering stage, microprocessor 44 determines in step 365 whether it is in an initial calibration mode. If so, microprocessor 44 skips steps 366 through 368 and advances directly to step 369. If microprocessor 44 determines that it is not in an initial calibration mode, it executes step 366 whereby it checks whether or not the vehicle speed is greater than 10 miles per hour. If the vehicle speed does not exceed 10 miles per hour, microprocessor 44 will not utilize the filtered raw data point (CURX, CURY) for purposes of calibration and therefore returns to step 212 (FIG. 14A) to collect the next raw data point. If the vehicle speed exceeds 10 miles per hour, microprocessor 44 determines whether the X- and Y-coordinate distances between the current averaged data point (CURX, CURY) are less than 2 counts from the previous averaged data point, which is stored as (PREVX, PREVY) (step 367). If the current averaged data point is spaced a distance greater than 2 counts from the previous averaged data point, microprocessor 44 considers the current averaged data point to be unstable and therefore clears the current averaged data point (CURX, CURY) as the previous averaged data point (PREVX, PREVY), and clears the data point (CURX, CURY) in step 368 and returns to step 212 to begin collecting additional raw data points for the computation of another averaged data point. If the current averaged data point is within 2 counts of the previous averaged data point, the microprocessor stores the X and Y values of the current averaged data point (CURX, CURY) in the respective variables PREVX and PREVY (step 369) and clears the TWITCNT counter, since a filtered averaged data point has thus been obtained without the TWITCNT counter having reached 128. Thus, the TWITCNT counter will have been reset to begin counting the number of twits occurring thereafter and prior to obtaining the next filtered averaged data point.

The averaged data points as filtered through the two stages defined by steps 360–364 and steps 365–369 are then subjected to yet another test in step 372 if microprocessor 44 determines in step 370 that it is not in an initial calibration mode. In step 372, the microprocessor determines whether the distance from the center of the circle (CENX, CENY) (as last determined) to the current filtered averaged data point (CURX, CURY) is either greater than 0.5 times the radius R of the circle (as last computed) or is less than 1.5 times the radius R as would be the case for the points $(X_3, Y_3)$ and $(X_4, Y_4)$ shown in the graph in FIG. 19. In other words, so long as each filtered averaged data point falls within 0.5 R to 1.5 R of the previously calculated center point (such as points $(X_3, Y_3)$ and $(X_2, Y_2)$), those data points are not filtered out. However, if the averaged data point is not within these bounds (such as points $(X_3, Y_3)$ or $(X_4, Y_4)$), the process not only clears out the values stored for those points, but also clears out the values of any previously obtained points (PX1, PY1), (PX2, PY2), and (PX3, PY3) that have been obtained as candidate points for recalibration (step 374) Additionally, the most recently obtained averaged data point (CURX, CURY) is also cleared, and status indicator TSAT is set equal to 1 prior to returning to step 212 to begin collecting new raw data points. If the most recently obtained filtered averaged data point passes the test in step 372, the process then checks in step 376 whether TSAT is equal to 1.

Figure 20:
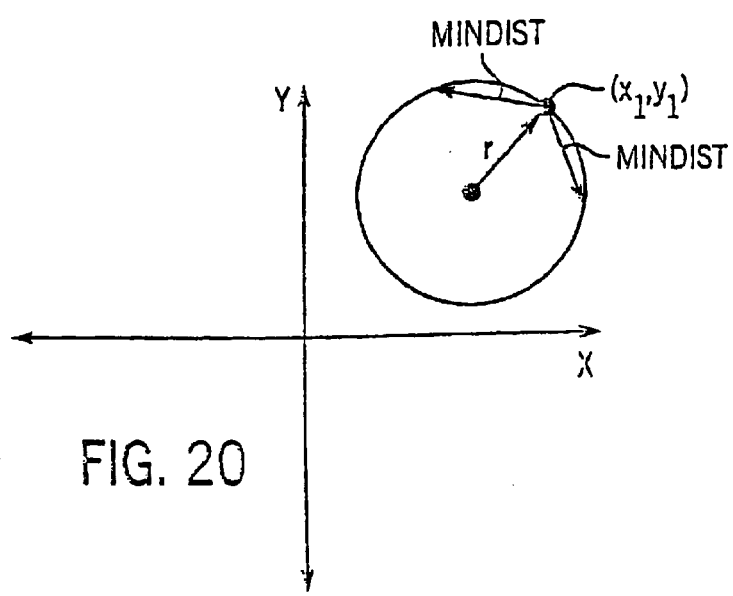
FIG. 20 is a graph illustrating the MINDIST test utilized in the process of the present invention for filtering data points.

If, in step 376 (FIG. 14C), the microprocessor determines that TSAT is not equal to 1, it knows that it has already obtained a first candidate data point. As noted in the overview above, to ensure the accuracy of any calculated center based upon three candidate data points, the compass microprocessor 44 determines whether a triangle whose end points are defined as the three candidate data points is substantially non-obtuse. As a proactive measure to ensure that a filtered averaged data point is not stored as a candidate data point for use in calibration, the processor compares the distance between the most recently obtained filtered averaged data point with the previously obtained candidate point(s) to a minimum distance threshold MINDIST (step 380), as illustrated in FIG. 20. If the most recently obtained filtered averaged data point is not at least a distance MINDIST away from the first candidate data point (PX1, PY1), the processor clears the most recently obtained filtered averaged data point (CURX, CURY) (step 382) and returns to step 212 to begin collecting more raw data points. As pointed out above, the value of MINDIST is initially set equal to the default (25 counts) or calculated value of the radius R. As will be discussed in more detail below, the value of MINDIST may be dynamically decreased if this criteria excludes data points on too frequent a basis or increased if the candidate data points that meet the MINDIST test nevertheless fail the subsequent tests as to whether the triangle is obtuse or too acute.

If TSAT is equal to 1 (step 376S), microprocessor 4 determines that it had not previously obtained the first candidate data point (PX1, PY1) for calculating the center of the circle as part of the calibration process. Thus, if TSAT is equal to 1, the microprocessor stores the value of CURB in PX1 and the value of CURY in PY1 sets TSAT equal to 2 so that it will subsequently know that it has already obtained the first candidate data point and is looking for a second candidate data point. Then, microprocessor 44 clears the values in CURX and CURY (step 378) prior to executing an ignition toggle subroutine (step 450) and returning to step 212 to begin collecting raw data points to obtain the second candidate data point for use in calibration.

Figure 4:
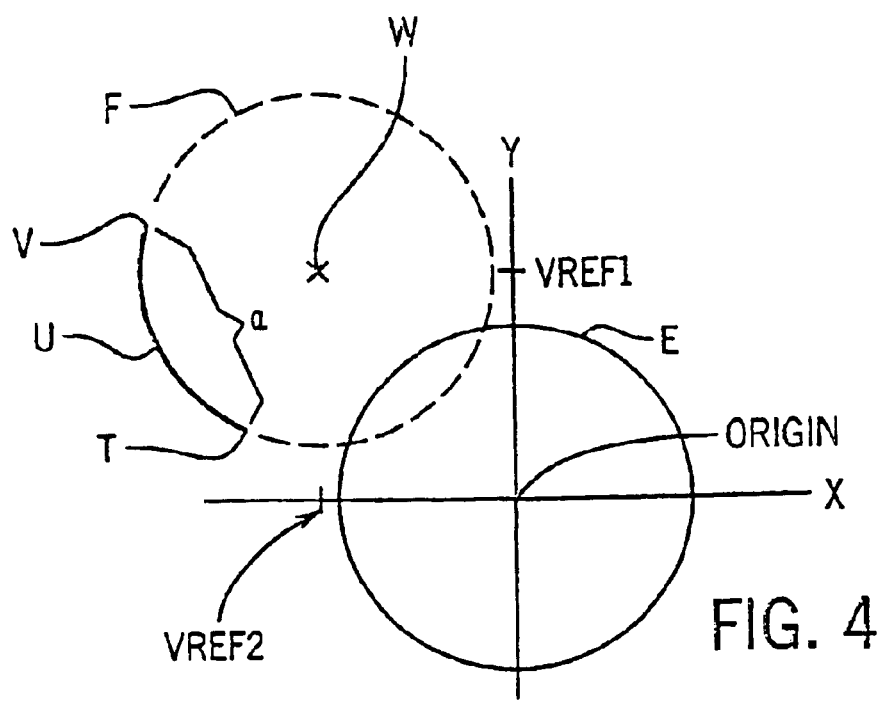
FIG. 4 is a graph illustrating the ideal signal from the magnetic field sensor and the signal after a change in vehicular magnetism whereby the center of the circle obtained after the change in magnetism is determined in accordance with the teachings of U.S. Pat. No. 5,737,226.
Figure 6:
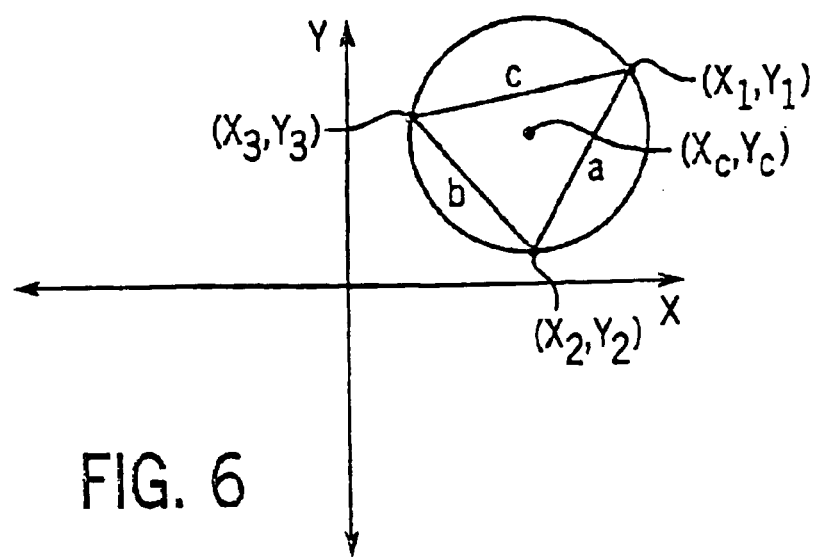
FIG. 6 is a graph illustrating the calibration method according to the present invention.
Figure 17:
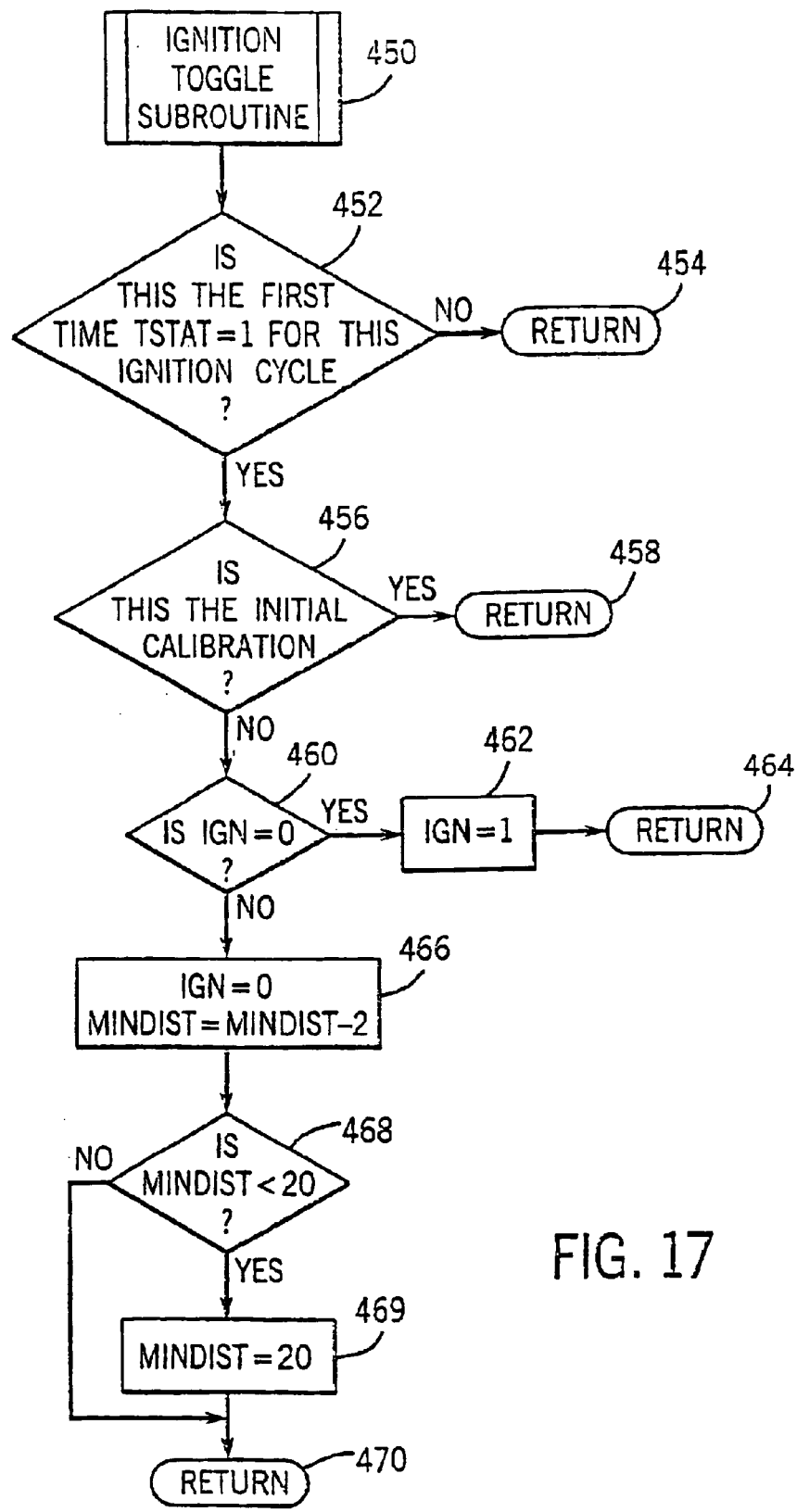
FIG. 17 is a flow chart illustrating the flow of operations for an ignition toggle subroutine executed as part of the main control loop shown in FIGS. 14A–14E.

The ignition toggle subroutine 450 is described below with reference to FIG. 17. Ignition toggle subroutine 450 begins in step 452 in which microprocessor 44 determines whether it is the first time that TSTAT is equal to 1 for the current vehicle ignition cycle. If it is not the first-time that TSTAT has equaled 1 for the current ignition cycle, microprocessor 44 returns (step 454) to the step following step 450 in FIG. 14C, which happens to be a branch to step 212 of FIG. 4A, whereby the next raw data point is obtained. If it is the first time that TSTAT has equaled 1 for the current ignition cycle, microprocessor 44 then determines in step

456 whether it is in an initial calibration mode. If yes, microprocessor 44 executes step 212 in FIG. 14A as indicated by return 458. If it is not the initial calibration, microprocessor 44 determines whether the value IGN is equal to 0 in step 460. The value IGN is initially set to 0 in step 202 (FIG. 14A). If the value IGN is equal to 0, microprocessor 44 sets IGN equal to 1 in step 462 prior to returning via step 464 to step 212 of FIG. 14A. If IGN is not equal to 0, microprocessor 44 sets ION equal to 0 in step 466 and sets the value of MINDIST equal to MINDIST-2.

Next, microprocessor 44 determines in step 468 whether MINDIST is less than 20. If it is less than 20, microprocessor 44 sets MINDIST equal to 20 in step 469 prior to returning to step 212 via return 470. Otherwise, if MINDIST is not less than 20, microprocessor 44 keeps MINDIST at the value set in step 466 prior to returning to step 212 via return 470. As will be explained further below, the value MINDIST is a minimum distance threshold that must exist between candidate data points for use in calibration. Thus, the purpose of the ignition toggle subroutine is to gradually decrease the minimum distance threshold so as to increase the time in which three candidate data points may be obtained.

Figure 14D:
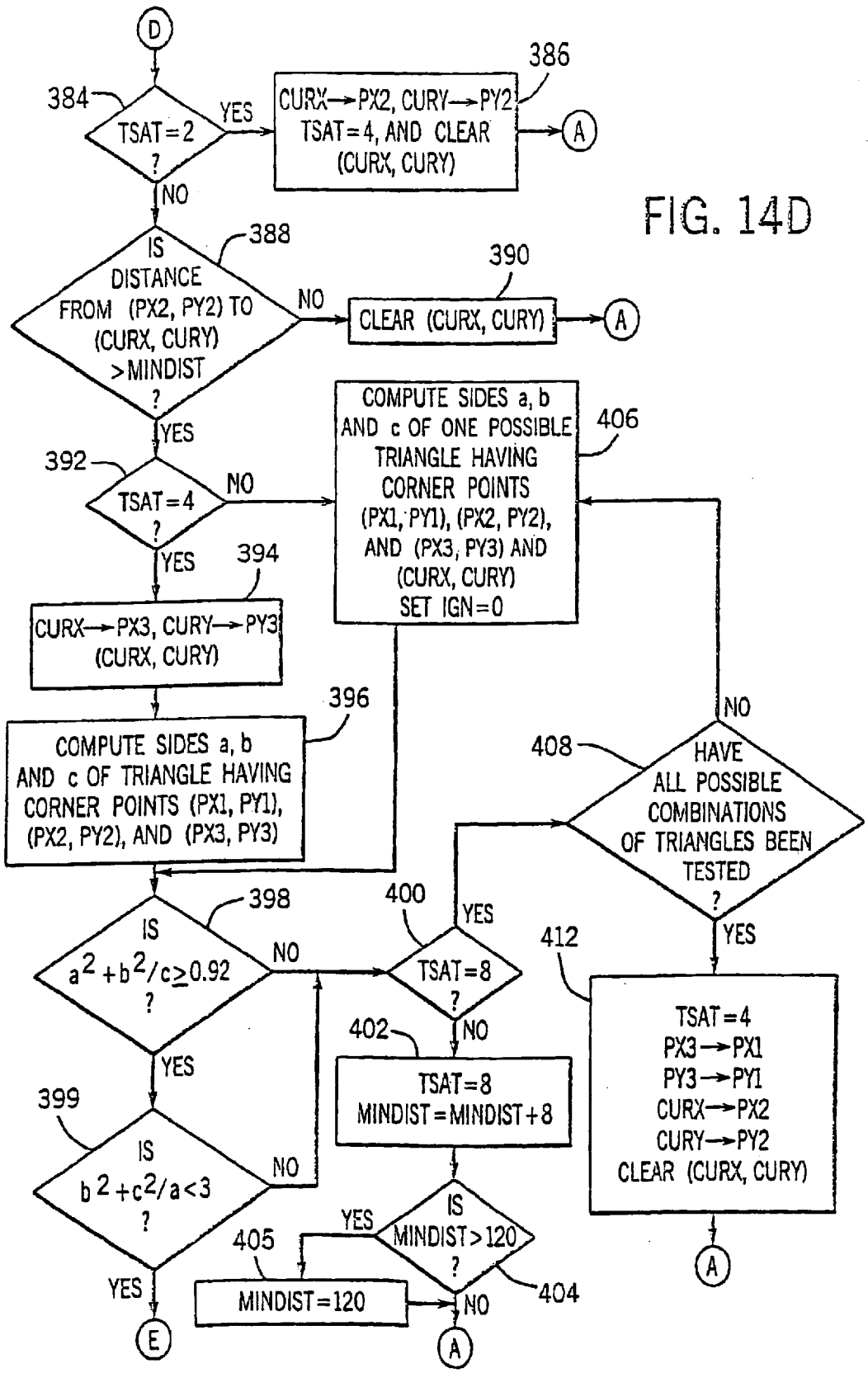
Figure 14E:
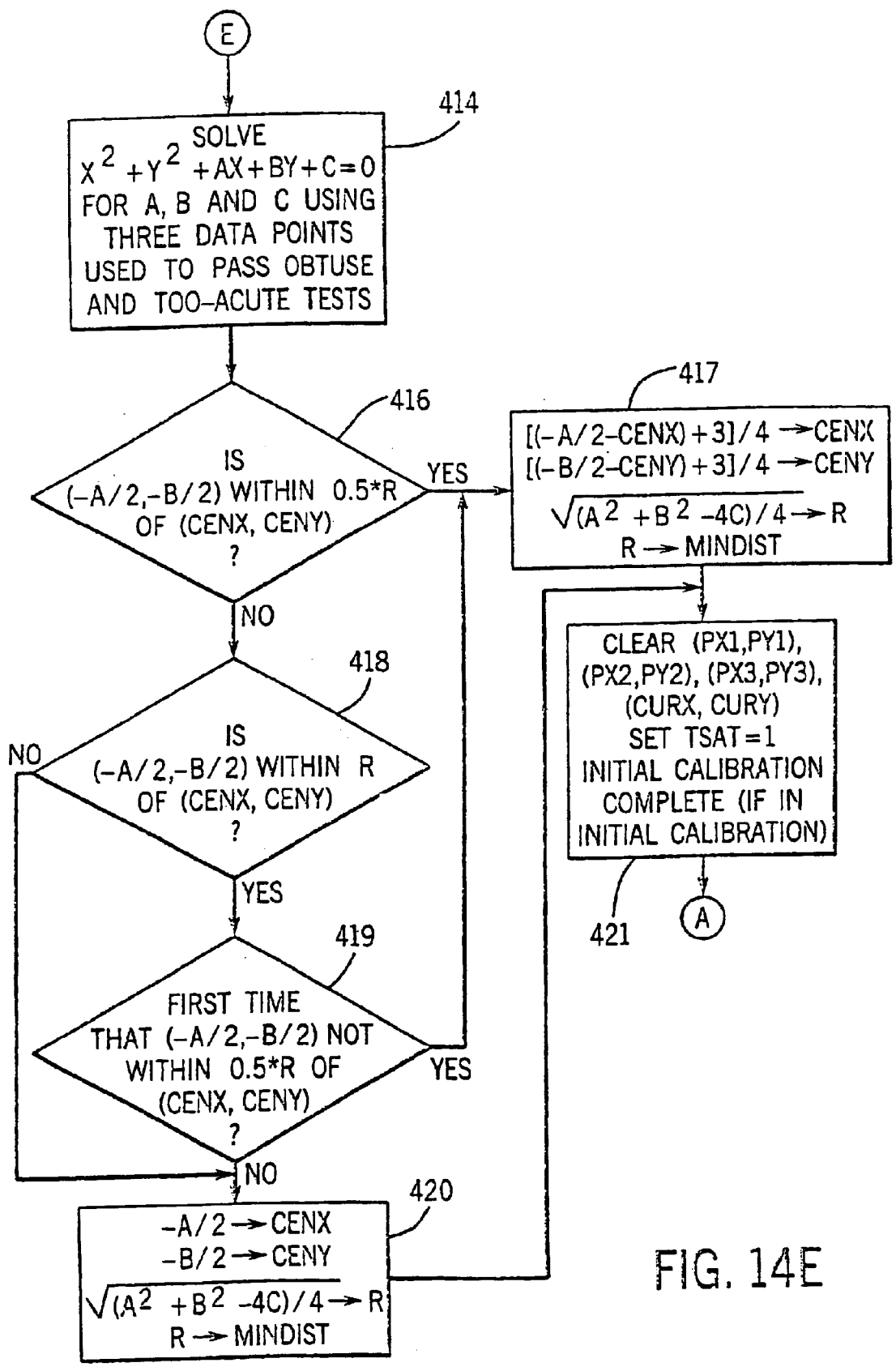
Figure 15:
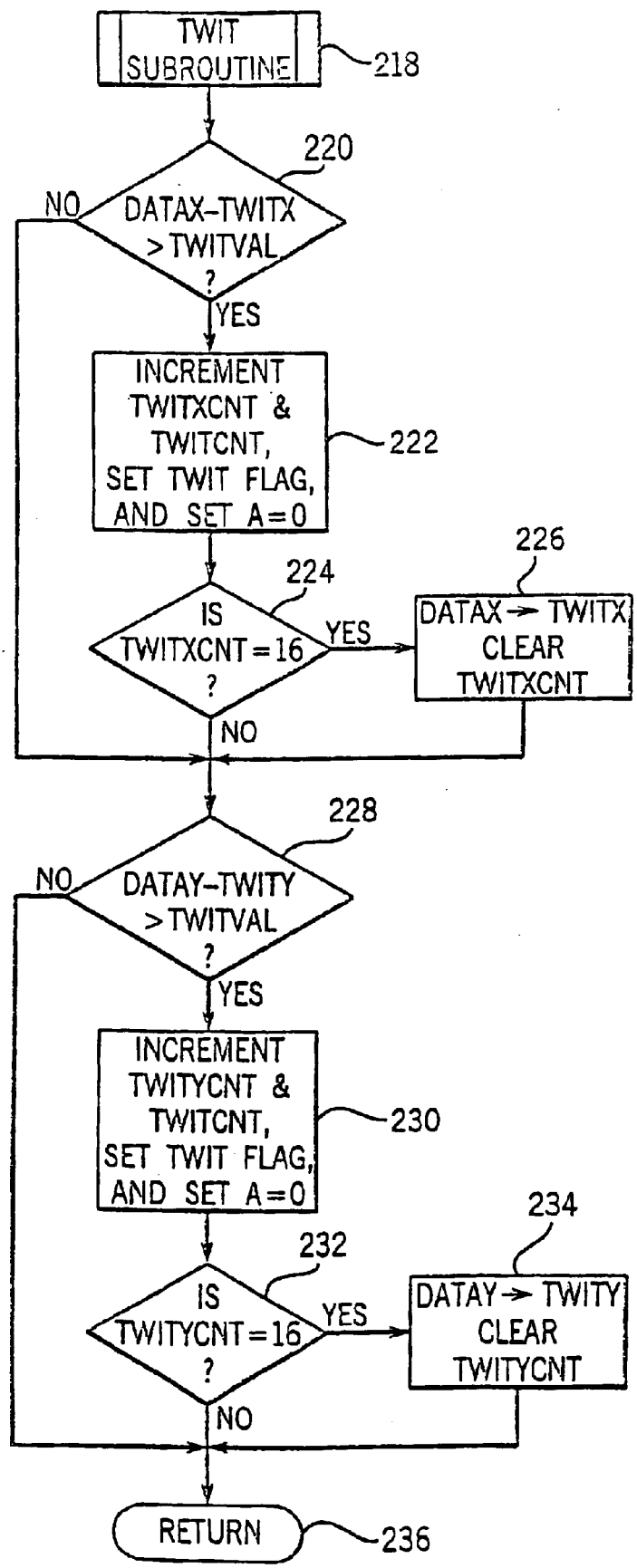
FIG. 15 is a flow chart illustrating the flow of operations for a TWIT subroutine executed as part of the main control loop shown in FIGS. 14A–14E.

If the current averaged filtered data point (CURS, CURY) is more than MINDIST away from the first candidate data point (PX1, PY1) (step 380, FIG. 14C), microprocessor 44 then checks whether TSAT is equal to 2 in step 334 (FIG. 14D). If TSAT is equal to 2, the microprocessor recognizes that it has not yet obtained a second candidate data point and therefore stores the values of CURX and CURY into PX2 and PY2, respectively, while setting TSAT equal to 4 and clearing the current averaged data point as stored in (CURX, CURY) (step 386). By setting TSAT equal to 4, the microprocessor will thereafter know that it has already obtained two candidate data points and is looking for a third. After performing step 336, the microprocessor returns to step 212 to begin looking at new raw data points.

If TSAT is not equal to 2, microprocessor 44 will recognize that at least two prior candidate data points have been obtained, and therefore, checks whether the distance of the current averaged data point (CURX, CURY) is at least MINDIST away from the second candidate data point (PX2, PY2) (step 388). If it is not a sufficient distance away from (PX2, PY2), the current averaged data point (CURX, CURY) is discarded in step 390 and microprocessor 44 thereafter returns to step 212 to obtain new raw data points. On the other hand, if the current averaged data point is a sufficient distance away from the second candidate data point, the microprocessor then checks whether TSAT is equal to 4 in step 392. If TSAT is equal to 4, the processor recognizes that it has not yet obtained a third candidate data point and therefore stores the value of CURX and CURY in the variables PX3 and PY3, respectively, and clears the values stored as the current averaged data point (CURX, CURY) (step 394).

Figure 21:
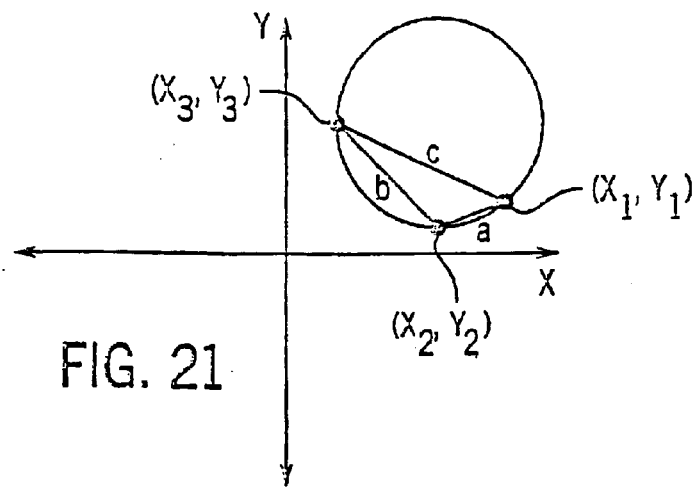
FIG. 21 is a graph illustrating the obtuse triangle check utilized by the process of the present invention.

Next, the microprocessor 44 computes the sides a, b, and c of a triangle having the three candidate data points (PX1, PY1), (PX2, PY2), and (PX3, PY3) as its corner points (step 396), where c is the longest side. Then, microprocessor 44 will determine whether the triangle formed by the three candidate data points defines a substantially non-obtuse triangle (step 398). The processor performs this test by determining whether $\sqrt{a^2+b^2}/c \geq 0.92$. Normally, an obtuse triangle is that where the aforementioned relationship is less than 1. However, through experimentation, it has been discovered that some slightly obtuse triangles exhibit sufficient accuracy for the calibration of the compass. Thus, those candidate data points that define a substantially non-obtuse triangle (e.g., acute triangles, right triangles, and slightly obtuse triangles) are considered acceptable for use in calibration of the compass system. An example of a non-acceptable obtuse triangle is illustrated in FIG. 21.

Figure 22:
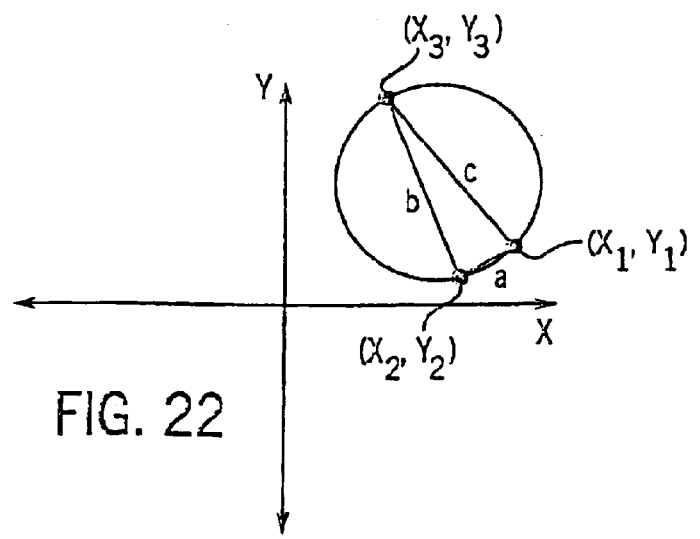
FIG. 22 is a graph illustrating the too-acute triangle test utilized by the process of the present invention.

If the three candidate data points pass the obtuse triangle criteria in step 398, the three candidate data points are then tested to determine whether they define an acute triangle that is too acute to ensure precise calibration. An example of a triangle that is too acute is illustrated in FIG. 22. The processor determines that a triangle is not too acute in step 399 when the relation $\sqrt{b^2+c^2}/a$ is less than 3. If the three candidate data points pass the obtuse and too-acute tests in steps 399 and 399, the process continues with steps 414–421 (FIG. 14E) whereby the center of the circle is computed based upon these three candidate data points.

If, however, the three candidate data points fail to meet the obtuse and too-acute triangle criteria of steps 398 or 399, microprocessor 44 then checks in step 400 whether TSAT is equal to 8. Initially, when only three candidate data points have been obtained, TSAT will not be equal to 8, but will be equal to 4, and therefore the process will continue in step 402 whereby TSAT is set equal to 8 and the value of MINDIST is incremented by 8 counts. By setting TSAT equal to 8, the processor will thereafter recognize that it had obtained three candidate data points that did not pass either the obtuse or too-acute data tests. As explained in more detail below, the microprocessor will nevertheless retain the values of the three candidate data points, but will return to step 212 to begin collecting raw data points to define a fourth potential candidate data point. Prior to returning to step 212, however, microprocessor 44 first checks whether incrementing MINDIST by 8 in step 402 has raised the value of MINDIST above a maximum threshold of 120. If it has, microprocessor 44 sets the value of MINDIST to 120 in step 405 prior to proceeding to step 212.

When the first three candidate data points fail either the obtuse or too-acute tests of steps 398 or 399 and TSAT has been set to 8, the processor will, upon reaching step 392 with a fourth potential candidate data point, recognize that it has four data points and thereafter execute step 406 whereby the processor utilizes this fourth data point whose X and Y values are stored in (CURX, CURY) in various combinations with the, three previously-obtained candidate data points. For each possible combination, the sides of a triangle defined by those three points are computed and reviewed under the obtuse and too-acute tests in steps 378 and 399. If, for example, the fourth data point in combination with the fist and second candidate data points still does not meet one of the obtuse or too-acute tests, the processor will then determine in step 400 that TSAT is equal to 8 and determine in step 408 whether all possible combinations of triangles formed by the three candidate points and the fourth potential candidate point have been tested. If not, the sides of the next triangle are computed in step 406 and subjected to the tests in steps 398 and 399.

If any one of these triangles defined by a combination including the fourth data point meets both tests, the process proceeds to steps 414–421 (FIG. 14E) to calculate the center of the circle and thereby calibrate the compass. On the other hand, if no combinations of the three candidate data points and the fourth data point produce a triangle that passes both the obtuse and too-acute triangle tests, the process replaces the X and Y values stored for the first and second candidate data points (PX1, PY1) and (PX2, PY2) with the X and Y values of the third candidate data point (PX3, PY3) and the fourth potential candidate data point (CURX, CURY, respectively). The values stored for the current filtered averaged data point (CURX, CURY) are then cleared and then TSAT is set equal to 4 (step 412), and the process then returns to step 212 to begin collecting the next set of raw data points. By setting TSAT equal to 4, the processor will thereafter recognize that it has two candidate data points and is looking for a third.

The process described above continues until three candidate data point have been obtained that meet all the foregoing tests. Once these three candidate data points have been identified, microprocessor 44 executes step 414 (FIG. 14E) whereby it solves the equation $X^2+Y^2+AX+BY+C=0$ for the values A, B, and C using the values (PX1, PY1), (PX2, PY2), and (PX3, PY3) for X and Y. Then, the processor makes the determination that the newly calculated center point is $(-A/2, -B/2)$. Next, the processor executes step 416 whereby it tests whether the newly calculated center $(-A/2, -B/2)$ is within 0.5 times the radius R of the center point (CENX, CENY) as previously calculated. If the newly computed center point is within this range of values (as would be the case with point $(X_{c2}, Y_{c2})$ illustrated in FIG. 23), the processor averages the newly obtained center point equally with the previously obtained center point and stores these averaged values into the variables CENX and CENY (step 417). Additionally, a new radius R is calculated which is equal to $\sqrt{(A^2+B^2-4C^2)}/4$. The new value for the radius R is then also stored as the new value of MINDIST. Subsequently, the processor executes step 421 whereby TSAT is set to 1 and all the values of the candidate data points and current data points and any other counters are cleared prior to returning to step 212 to begin collecting raw data points to be used for subsequent calibrations. In this manner, each time three acceptable candidate points are identified, the compass system of the present invention will recalibrate itself based upon these three data points. Additionally, if the compass is in its initial calibration mode, a flag is set to subsequently identify that the compass is no longer in its initial calibration mode.

Figure 23:
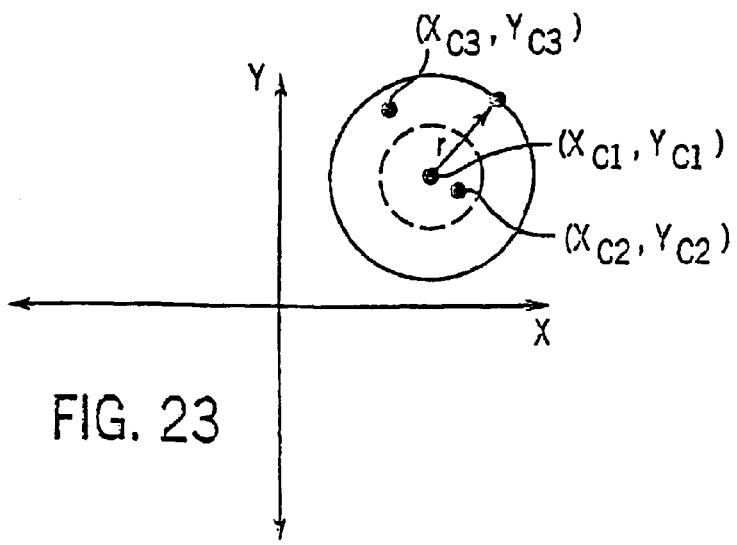
FIG. 23 is a graph illustrating the manner by which the compass system of the present invention discriminates between calculated center points to obtain a current center point to be used for compass calibration.

If, in step 416, the microprocessor determines that the newly calculated center point falls outside of the acceptable 0.5 times R range (as would be the case if the newly calculated center were $(X_{C3}, Y_{C3})$ as illustrated in FIG. 23), the microprocessor proceeds to step 418. It checks whether the newly calculated center point $(-A/2, -B/2)$ is within R of the center point (CENX, CENY) as previously calculated. If the newly calculated center point is not within R of the previously calculated center point, processor 44 advances to step 420 whereby the newly calculated center point $(-A/2, -B/2)$ is stored as the center point (CENX, CENY), the value $\sqrt{(A^2+B^2-4C^2)}/4$ is stored as the new radius R, and the value of the new radius R is stored as the new minimum distance MINDIST (step 420) prior to advancing to step 421.

If the newly calculated center point is not within R of the center point (CENX, CENY), microprocessor 44 proceeds to step 419 whereby it checks whether it is the first time a newly calculated center point is not within 0.5 R of the current center point. If it is the first time, the processor performs the steps in block 417 whereby it averages in the newly calculated center point with the previous center point. On the other hand, if it is not the first time that a newly calculated center point is not within 0.5 R of the previous center point, the processor then assumes that the previous center point is inaccurate and stores the values of the newly calculated center $(-A/2, -B/2)$ in the values for the current center point (CENX, CENY) (step 420). After calculating the new radius R and storing the value of R as the new value for MINDIST, the processor proceeds to step 421 where it clears all the prior candidate values and flags and returns to step 212.

Having obtained a center point for the circular plot of data, the offset of the center from the origin of the reference coordinate plane is then used in step 359 (FIG. 14B) to offset the raw data point used to compute the vehicle's current heading.

The calibration technique of the present invention allows the compass to be initially calibrated with multiple driving patterns. One such pattern is to drive the vehicle in circles as is typically used in initially calibrating most commercially available compasses. The compass of the present invention can also be calibrated by pointing the vehicle in three different directions. Thus, the compass of the present invention may be calibrated in smaller areas where it is difficult to turn complete circles. During initial calibration, the compass system of the present invention preferably utilizes all the filtering and data checking with the exceptions of (1) checking whether the vehicle is traveling at an excess of 10 miles per hour, (2) determining whether a raw data point is within 3 counts of a previous raw data point, (3) determining whether a data point is within 0.5 R and 1.5 R of the center of the circle, and (4) determining whether the candidate data points define a triangle that is too acute. By eliminating these filtering and processing requirements, the compass system may obtain an initial center point more quickly, yet still provide a relatively accurate calibration.

Although the above process is described as utilizing numerous filters and tests that are intended to ensure the accuracy of calibration, it will be appreciated by those skilled in the art that the various concepts embodied within the above process may be implemented in various combinations with or without some of these filtering processes and tests. Although eliminating a filtering step or test from the above-described detailed embodiment may have a slight adverse effect on the accuracy at which the inventive compass system calibrates itself, the accuracy of calibration may not be significantly affected by the removal of any one or more of the filters or test steps.

Although the present invention has been described with reference to flowcharts that illustrate specific steps and sequences of steps, it will be appreciated by those skilled in the art that the flowcharts are provided merely for purposes of description of the invention and that the present invention may be implemented utilizing various different programming sequences. Further, although the present invention has been described with respect to a circular plot of data and triangles defined by the raw data points, the concepts of the invention may similarly be applied in compass systems where the processor does not specifically translate each sensor reading into X and Y coordinates that are plotted in an X-Y coordinate plane. For example, some compass systems analyze the output signals from each of the sensors separately. Thus, regardless of how the processor of a compass system actually perceives the electrical signals from the sensors, the processing of these signals may nevertheless fall within the spirit and scope of the present invention if the output signals from the sensors may otherwise be considered as points within an X-Y coordinate plane that are essentially processed in a manner equivalent to the present invention.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the Doctrine of Equivalents.

What is claimed is:

1. A method for calibrating an electronic compass, comprising:

calculating a first averaged data point using a first predetermined number of data points;

calculating a second averaged data point using a second predetermined number of data points;

calculating a third averaged data point;

calculating deviation compensation data based on a combination of the first averaged data point, the second averaged data point, and the third averaged data point;

determining if a vehicle is moving a predetermined speed; and obtaining data for at least one of the first averaged data point, the second averaged data point, and the third averaged data point based on the determination of vehicle speed.

2. The method of claim 1, further comprising displaying a heading based on data that has been received from the electronic compass and that has been compensated based on the deviation compensation data.

3. The method of claim 1, wherein calculating the first averaged data point comprises calculating the first averaged data point based on a predetermined number of consecutive points that meet a predetermined criteria.

4. The method of claim 1, further comprising using the combination of the averaged data points to calculate an x-axis offset and a y-axis offset.

5. The method of claim 1, wherein the first predetermined number of data points and the second predetermined number of data points are a same number.

6. The method of claim 1, wherein calculating deviation compensation based on a combination of the first averaged data point, the second averaged data point, the third averaged data point comprises;

determining that the first averaged data point, the second averaged data point, and the third averaged data point do not meet a predetermined criteria;

determining a combination of any two of the first, second, and third averaged data points and a fourth averaged data point that meet the predetermined criteria; and calculating the offset using the combination of three averaged data points that meet the predetermined criteria.

7. The method of claim 6, wherein the predetermined criteria includes at least one of;

a. the data points are a minimum distance apart from each other;

b. three of the data points do not form a substantially obtuse triangle; and c. three of the data points do not form a triangle that is too acute.

* * * * *